United States Patent
Hayes et al.

(10) Patent No.: US 11,592,956 B2
(45) Date of Patent: *Feb. 28, 2023

(54) ELECTRONIC PRESENTATION REPOSITORY AND INTERFACE

(71) Applicant: Oracle International Corporation, Redwood Shores, CA (US)

(72) Inventors: Shaun Hayes, Canley Heights (AU); John Vakoc, Castle Rock, CO (US); Konrad Rogers, Highlands Ranch, CO (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 249 days.

This patent is subject to a terminal disclaimer.

(21) Appl. No.: 17/001,006

(22) Filed: Aug. 24, 2020

(65) Prior Publication Data
US 2020/0387292 A1 Dec. 10, 2020

Related U.S. Application Data

(63) Continuation of application No. 16/379,234, filed on Apr. 9, 2019, now Pat. No. 10,761,682, which is a
(Continued)

(51) Int. Cl.
*G06F 16/438* (2019.01)
*G06F 3/04817* (2022.01)
(Continued)

(52) U.S. Cl.
CPC ...... *G06F 3/04817* (2013.01); *G06F 16/4393* (2019.01); *G06F 16/538* (2019.01); *G06F 16/9038* (2019.01); *G06F 21/6209* (2013.01)

(58) Field of Classification Search
CPC .............. G06F 16/4393; G06F 16/538; G06F 16/9038; G06F 21/6209; G06F 3/04817
See application file for complete search history.

(56) References Cited

U.S. PATENT DOCUMENTS 6,058,417 A    5/2000   Hess et al.
6,085,185 A    7/2000   Matsuzawa et al.
(Continued)

OTHER PUBLICATIONS

U.S. Appl. No. 14/863,869, Final Office Action dated May 3, 2018, 23 pages.
(Continued)

*Primary Examiner* — Robert W Beausoliel, Jr.
*Assistant Examiner* — Nirav K Khakhar
(74) *Attorney, Agent, or Firm* — Kilpatrick Townsend & Stockton LLP

(57) ABSTRACT

Embodiments of the invention include techniques for storing and managing repositories of electronic presentation documents. Presentation storage repositories may be implemented in various storage systems including individual computer servers, distributed storage networks, cloud-based storage systems, and the like. Presentation search interfaces may support various searching and customization capabilities. Search interface and search engine components may be implemented to receive search requests from client devices, retrieve electronic presentation data from one or more storage repositories, and generate customized search results based on the retrieved electronic presentation data. Search and presentation capabilities may include storing user-specific selections of presentation cover slides, and then retrieving and/or generating user-specific thumbnails for search results interfaces. Additionally, presentation access and usage statistics may be tracked and stored within the storage repository and may be incorporated into the customized searching and presentation capabilities.

20 Claims, 12 Drawing Sheets

Related U.S. Application Data continuation of application No. 14/863,869, filed on Sep. 24, 2015, now Pat. No. 10,296,163.

(60) Provisional application No. 62/055,417, filed on Sep. 25, 2014.

(51) Int. Cl.
*G06F 21/62* (2013.01)
*G06F 16/9038* (2019.01)
*G06F 16/538* (2019.01)

(56) References Cited

U.S. PATENT DOCUMENTS

| | | |
|---|---|---|
| 6,374,260 B1 | 4/2002 | Hoffert et al. |
| 8,078,603 B1 | 12/2011 | Chandratillake et al. |
| 10,296,163 B2 | 5/2019 | Hayes et al. |
| 2002/0011990 A1 | 1/2002 | Anwar |
| 2005/0010955 A1 | 1/2005 | Elia et al. |
| 2005/0223068 A1 | 10/2005 | Shohfi et al. |
| 2006/0204142 A1 | 9/2006 | West et al. |

OTHER PUBLICATIONS

U.S. Appl. No. 14/863,869, Non-Final Office Action dated Sep. 26, 2017, 31 pages.
U.S. Appl. No. 14/863,869, Notice of Allowance dated Jan. 11, 2019, 13 pages.
U.S. Appl. No. 16/379,234, Non-Final Office Action dated Oct. 2, 2019, 11 pages.
U.S. Appl. No. 16/379,234, Non-Final Office Action dated Apr. 15, 2020, 6 pages.
U.S. Appl. No. 16/379,234, Notice of Allowance dated Apr. 29, 2020, 9 pages.

Example Electronic Presentation Properties Table

600a

| Property | Value |
|---|---|
| Presentation Name | ... |
| Owner (User) | ... |
| Path/Location | ... |
| Added (Date) | ... |
| Number of Views | ... |
| Number of Shares | ... |
| Number of Downloads | ... |
| ... | ... |

FIG. 6A

Example Electronic Presentation Table for User A

600b

| Title | Access | # of Times Viewed | # of Times Shared | # of Times Downloaded | Cover Slide |
|---|---|---|---|---|---|
| Cloud_Intro.PPT | Owner | 26 | 0 | 2 | ID=004 |
| Cloud_Pres.PPT | Owner | 8 | 3 | 1 | Null |
| SaaS_v1.PPT | Owner | 14 | 8 | 4 | ID=001 |
| SaaS_v2.PPT | Owner | 33 | 2 | 0 | ID=014 |
| Virtual_Intro.PPT | Shared by ... | 4 | 0 | 4 | Null |
| Sales_Figs.PPT | Shared by ... | 17 | 0 | 1 | ID=004 |
| ... | ... | ... | ... | ... | ... |

FIG. 6B

ELECTRONIC PRESENTATION REPOSITORY AND INTERFACE

CROSS-REFERENCES TO RELATED APPLICATIONS

This application is a continuation of U.S. application Ser. No. 16/379,234, entitled "ELECTRONIC PRESENTATION REPOSITORY AND INTERFACE", filed on Apr. 9, 2019, which is hereby incorporated by reference in its entirety for all purposes.

U.S. patent application Ser. No. 16/379,234, is a continuation of U.S. patent application Ser. No. 14/863,869, entitled "ELECTRONIC PRESENTATION REPOSITORY AND INTERFACE", filed on Sep. 24, 2015, now U.S. Pat. No. 10,296,163, issued May 21, 2019, which is hereby incorporated by reference in its entirety for all purposes.

U.S. patent application Ser. No. 14/863,869 claims benefit under 35 USC 119(e) of U.S. Provisional Patent Application No. 62/055,417, entitled "LIGHTBOX", filed on Sep. 25, 2014, the entire contents of which are incorporated herein by reference for all purposes.

BACKGROUND

The present disclosure relates to computer systems and software, and more particularly to techniques for storing and managing repositories of electronic presentation documents, as well techniques for providing customized search and presentation capabilities on such repositories.

Maintaining and providing access to large storage repositories of documents may require complex combinations of storage system hardware and software. Implementing such systems may involve addressing many technical challenges and usability issues. For example, document storage repositories may be implemented using one or more different computing architectures and/or storage systems, including standalone and single-server computing systems, distributed computing and storage systems, cloud-based systems, etc. Moreover, a document repository may receive and store documents from multiple different sources, including documents of different types and different various of documents associated with different users. Additionally, such systems may implement different levels of user access and various different authentication techniques may be provided via one or more end-user applications.

BRIEF SUMMARY

Aspects described herein provide various techniques for storing and managing repositories of electronic presentation documents. In various embodiments, storage repositories may be implemented in one or more storage systems, including computer servers, distributed storage networks, and/or cloud-based storage systems. Additional techniques are described herein for providing search interfaces supporting various searching and customization capabilities, along with corresponding search results interfaces. Search interface and search engine components may be implemented to receive search requests from client devices, retrieve electronic presentation data from one or more storage repositories, and generate customized search results based on the retrieved electronic presentation data. In some embodiments, the search and presentation capabilities may include storing user-specific selections of presentation cover slides, and then retrieving and/or generating user-specific thumbnails for search results interfaces. Additional techniques described herein may include tracking presentation access and usage statistics within the storage repository and incorporating such usage statistics into the customized searching and presentation capabilities provided.

BRIEF DESCRIPTION OF THE DRAWINGS

FIGS. 6A and 6B are data tables containing example data relating to electronic presentations within a storage repository, according to one or more embodiments of the present invention.

DETAILED DESCRIPTION

Figure 1:
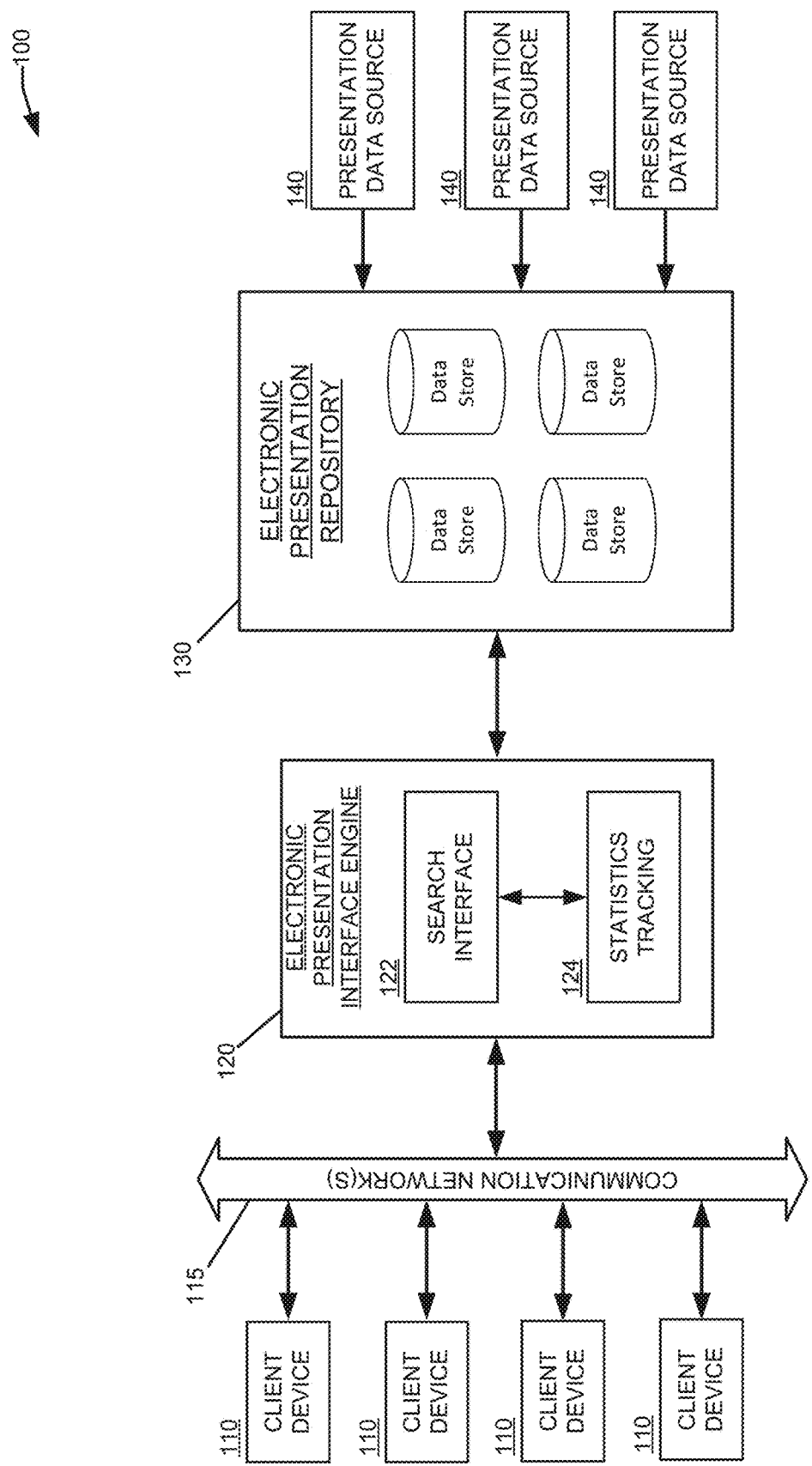
FIG. 1 is a block diagram illustrating, at a high-level, a computing environment including a storage repository and interface engine for searching and providing customized views of electronic presentations within storage repository, according to one or more embodiments of the present invention.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to non-transitory media such as portable or fixed storage devices, optical storage devices, and various other mediums capable of storing, containing or carrying instruction(s) and/or data. A code segment or computer-executable instructions may represent a procedure, a function, a sub-program, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various techniques (e.g., methods, systems, non-transitory computer-readable storage memory storing a plurality of instructions executable by one or more processors, etc.) are described herein for storing and managing repositories of electronic presentation documents. In various embodiments, storage repositories may be implemented in one or more storage systems, including computer servers, distributed storage networks, and/or cloud-based storage systems. Additional techniques are described herein for providing search interfaces supporting various searching and customization capabilities, along with corresponding search results interfaces. Search interface and search engine components may be implemented to receive search requests from client devices, retrieve electronic presentation data from one or more storage repositories, and generate customized search results based on the retrieved electronic presentation data. In some embodiments, the search and presentation capabilities may include storing user-specific selections of presentation cover slides, and then retrieving and/or generating user-specific thumbnails for search results interfaces. Additional techniques described herein may include tracking presentation access and usage statistics within the storage repository and incorporating such usage statistics into the customized searching and presentation capabilities provided. Various additional details of embodiments of the present invention will be described below with reference to the figures.

Referring now to FIG. 1, is a block diagram illustrating, at a high-level, components of an exemplary system which may be used for searching and providing customized views of electronic presentations within storage repository, in accordance with various embodiments described herein. In this example, computing environment 100 contains various computing devices and systems, including client devices 110 and an electronic presentation interface engine 120 configured to provide search interfaces to client devices 110 and implement searching and presentation capabilities. Computing environment 100 also includes a storage repository 130 configured to receive and store electronic presentations from one or more data sources 140. As discussed below, various implementations of the devices and systems within computing environment 100 may include specialized hardware and/or software components configured to store and manage repositories of electronic presentations, and provide searching and customized presentation capabilities. In order to perform these features and other functionality described herein, each of the components and sub-components shown in example computing environment 100, such as the servers used to implement the electronic presentation interface engine 120 and/or storage repository 130 may correspond to a single computing device or server, or to a complex computing system including a combination of computing devices, storage devices, network components, etc. Each of these components and their respective subcomponents may be implemented in hardware, software, or a combination thereof. The components shown in environment 100 may communicate directly with one another (e.g., via communication network 115), or indirectly via one or more intermediary network components, such as satellite system components, telecommunication or cable network components, routers, gateways, firewalls, and the like. Although these physical network components have not been shown in this figure so as not to obscure the other elements, it should be understood that any of the network hardware components and network architecture designs may be implemented in various embodiments to support communication between the various client devices 110, interface engine 120, storage repository 130, and data sources 140.

Client devices 110 shown in FIG. 1 may include personal computers, laptop, smartphones, tablet computers, and other various types of computing devices, each of which may include some or all of the hardware, software, and networking components discussed below in reference to FIGS. 9-10. For example, client devices 110 may correspond to any of devices 902-809 discussed below, or any other computing device with sufficient memory, processing resources, network capabilities, and/or I/O subcomponents for accessing the interface engine 120 and invoking the functionality for searching and accessing electronic presentations from the storage repository 130. In order to search for, access, download, and execute electronic presentations stored within repository 130, client devices 110 in some embodiments may include the necessary hardware and software components to establish the network interfaces, and the security and authentication capabilities to access interface engine 120 and invoke the software components stored thereon.

Communication network(s) 115 may be any type of network familiar to those skilled in the art that can support data communications using any of a variety of commercially-available protocols. In some embodiments, network 115 may include any combination of the networking hardware and software components discussed below in reference to FIGS. 9-10 (e.g., network 910). Communication network 115 may include, for example, and without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), and the like. Merely by way of example, network(s) 115 may be local area networks (LAN), such as one based on Ethernet, Token-Ring and/or the like. Network(s) 115 also may be wide-area networks, such as the Internet. Networks 115 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 115. Additionally, although only a single communication network 115 is shown in this example, it should be understood that the same communication network(s) and/or different networks may be used for communication between the other systems 110-140 in computing environment 100.

Electronic presentation interface engine 120 may include hardware and software components used to provide search functionality to client devices 110 and access electronic presentation storage repositories 130, along with components to provide the various searching and presentation customization features described herein. The electronic presentation interface engine 120 may be implemented on a single computer server or a complex computing system including a combination of computing devices, storage devices, network components, etc. Each of these components and their respective subcomponents may be implemented in hardware, software, or a combination thereof. For example, as shown in FIG. 1, electronic presentation interface engine 120 may include at least a search interface component 122 and a statistic tracking module 124, each of which may be implemented with specialized software and/or hardware. The electronic presentation interface engine 120 and its various components and subcomponents may be implemented, for example, using any combination of the hardware, software, and network elements discussed below in reference to FIG. 10.

Computing environment 100 also includes an electronic presentation storage repository 130. As noted above, one or more storage repositories 130 may be implemented and configured to receive and store electronic presentations from various data sources 140. The electronic presentations may be stored as documents within the storage repository 130, and each electronic presentation may have one or more sets of associated users (e.g., document owner, users authorized to access, modify, etc.). In some embodiments, the electronic presentations stored in repository 130 may include documents having multiple different presentation formats, for example, Microsoft PowerPoint®, Apple Keynote®, Google Slides®, Prezi®, and other presentation document formats. In addition to storing the electronic presentations themselves, storage repository 130 also may store various properties/metadata associated with the electronic presentations and the usage of the electronic presentations within the computing environment 100. For example, one or more storage systems within the repository 130 may be configured to store and manage a complete list of document properties, authentication permissions (e.g., sharing), and access/usage statistics for each electronic presentation in the repository 130. In some embodiments, these data may be store within the same data stores/databases as the presentation documents themselves. For instance, properties, permissions for various users, and access/usage data, may be stored within the document itself as properties or metadata. Additionally or alternatively, some or all of this associated data may be stored separately from the presentation documents, including in some cases separate secured storage systems and/or different storage devices used to store and maintain ownership and access data, user authentication data, document access data, usage statistics, and the like.

Each of the one or more storage repositories 130 may be implemented using one or more back-end storage systems, including various combinations of the hardware, software, and network elements discussed below in reference to FIGS. 9-10. In various examples, the servers of the electronic presentation interface engine 120 and storage repositories 130 may reside within the same datacenters and some hardware environments, or may operate at a remote locations communicating over secure or unsecure networks. In some cases, one or more storage repositories 130 may reside on a non-transitory storage medium within one or more servers of the electronic presentation interface engine 120. Storage repositories 130 may be implemented as single computer servers, back-end server farms, storage clusters, and/or storage-area network (SAN), etc. In various embodiments, storage repositories 130 may be configured to be under the control of a single entity, or may reside on separate servers operated by different entities and/or at remote locations. In some cases, access to storage repositories 130 may be limited or denied based on the processes, user credentials, and/or devices attempting to interact with the data store.

Various embodiments described herein may be implemented within one or more different computing architectures, including standalone and single-server computing systems, distributed computing systems, web-based and other client-server systems, etc. In some cases, cloud-based computing systems and techniques may be used to implement the storage repository 130 used to store electronic presentations and/or the electronic presentation interface engine 120 used to access the electronic presentations and provide cusomtized searching and presentation capabilities. Additionally, some embodiments described herein may be implemented using service-oriented architecture (SOA) techniques and tools, while alternatively or additionally, various other analysis and design methodologies may be used. Thus, although certain example systems described herein use a cloud-based service-oriented architecture, such as the system described below in reference to FIGS. 2A-2B, it should be understood that similar or identical embodiments may be implemented using other computing architectures and/or storage systems.

Figure 2A:
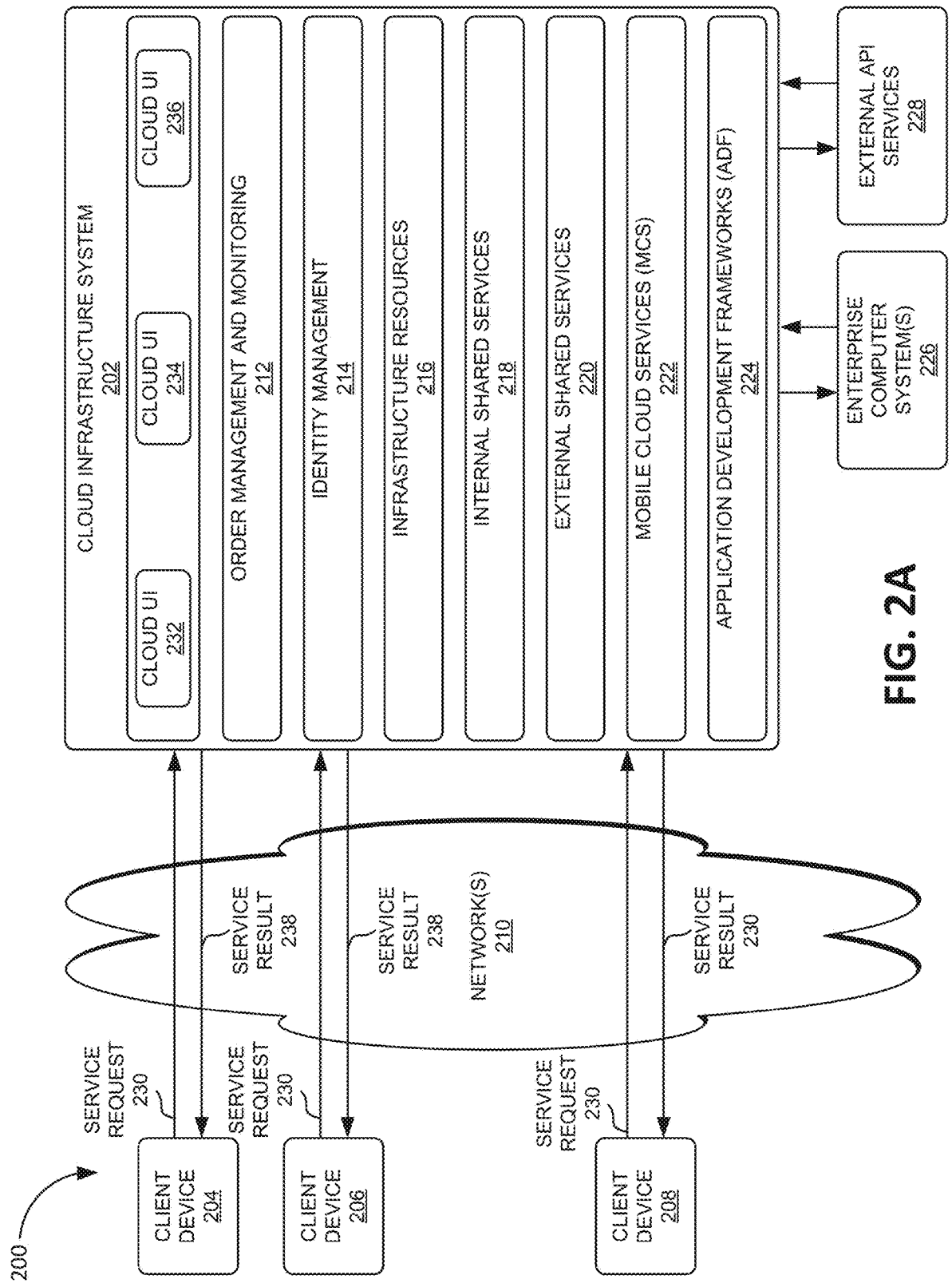
FIG. 2A is a block diagram illustrating components of a system environment by which services provided by embodiments of the present invention may be offered as cloud services.

Referring now to FIG. 2A, a simplified block diagram is shown including one or more components of system environment 200 by which services provided by one or more components of an embodiment system may be offered as cloud services, in accordance with various embodiments of the present disclosure. In the illustrated example, system environment 200 includes cloud infrastructure system 202 that provides cloud services to one or more client computing devices 204, 206, and 208. Client computing devices 204, 206, and 208 may be used by users to interact with cloud infrastructure system 202. Client computing devices 204, 206, and 208 may be configured to operate a client application such as a web browser, a proprietary client application (e.g., Oracle Forms), or some other application, which may be used by a user of the client computing device to interact with cloud infrastructure system 202 to use services provided by cloud infrastructure system 202.

It should be appreciated that cloud infrastructure system 202 depicted in FIG. 2A may have other components than those depicted. Further, the embodiment shown in FIG. 2A is only one example of a cloud infrastructure system that may incorporate an embodiment of the invention. In some other embodiments, cloud infrastructure system 202 may have more or fewer components than shown in FIG. 2A, may combine two or more components, or may have a different configuration or arrangement of components.

Client computing devices 204, 206, and 208 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. Client computing devices 204, 206, and 208 can be general purpose personal computers including, by way of example, personal computers and/or laptop computers running various versions of Microsoft Windows®, Apple Macintosh®, and/or Linux operating systems. Client computing devices 204, 206, and 208 can be workstation computers running any of a variety of commercially-available UNIX® or UNIX-like operating systems, including without limitation the variety of GNU/Linux operating systems, such as for example, Google Chrome OS. Alternatively, or in addition, Client computing devices 204, 206, and 208 may be any other electronic device, such as a thin-client computer, an Internet-enabled gaming system (e.g., a Microsoft Xbox gaming console with or without a Kinect® gesture input device), and/or a personal messaging device, capable of communicating over network(s) 210.

Although exemplary system environment 200 is shown with three client computing devices, any number of client computing devices may be supported. Other devices such as devices with sensors, etc. may interact with cloud infrastructure system 202.

Network(s) 210 may facilitate communications and exchange of data between clients 204, 206, and 208 and cloud infrastructure system 202. Network(s) 210 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 210 can be a local area network (LAN), such as one based on Ethernet, Token-Ring and/or the like. Network(s) 210 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Cloud infrastructure system 202 may comprise one or more computers and/or servers. These computer systems or servers may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, one or more computer systems or servers associated with cloud infrastructure system 202 may be adapted to run one or more services or software applications described in the foregoing disclosure. For example, one or more computer systems or servers associated with cloud infrastructure system 202 may correspond to a server for performing processing described herein according to an embodiment of the present disclosure.

One or more computer systems or servers associated with cloud infrastructure system 202 may run an operating system including any of those discussed above, as well as any commercially available server operating system. One or more computer systems or servers associated with cloud infrastructure system 202 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In certain embodiments, services provided by cloud infrastructure system 202 may include a host of services that are made available to users of cloud infrastructure system 202 on demand, such as online data storage and backup solutions, Web-based e-mail services, hosted office suites and document collaboration services, database processing, managed technical support services, and the like. Services provided by cloud infrastructure system 202 can dynamically scale to meet the needs of its users. A specific instantiation of a service provided by cloud infrastructure system 202 is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service instance instantiated by cloud infrastructure 202 may include protected computer network access to storage, a hosted database, a hosted web server, a software application, or other service provided by a cloud vendor to a user, or as otherwise known in the art. For example, a service instance instantiated by cloud infrastructure 202 can include password-protected access to remote storage on the cloud through the Internet. As another example, a service instance instantiated by cloud infrastructure 202 can include a web service-based hosted relational database and a script-language middleware engine for private use by a networked developer. As another example, a service instance instantiated by cloud infrastructure 202 can include access to an email software application hosted on a cloud vendor's web site.

In certain embodiments, cloud infrastructure system 202 may include a suite of applications, middleware, development service, and database service offerings that are delivered to a customer in a self-service, subscription-based, elastically scalable, reliable, highly available, and secure manner. An example of such a cloud infrastructure system as embodied in cloud infrastructure service 202 is the Oracle Public Cloud provided by the present assignee.

Cloud infrastructure system 202 may provide the cloud services via different deployment models. For example, services may be provided under a public cloud model in which cloud infrastructure system 202 is owned by an organization selling cloud services (e.g., owned by Oracle) and the services are made available to the general public or different industry enterprises. As another example, services may be provided under a private cloud model in which cloud infrastructure system 202 is operated solely for a single organization and may provide services for one or more entities within the organization. The cloud services may also be provided under a community cloud model in which cloud infrastructure system 202 and the services provided by cloud infrastructure system 202 are shared by several organizations in a related community. The cloud services may also be provided under a hybrid cloud model, which is a combination of two or more different models.

In some embodiments, the services provided by cloud infrastructure system 202 may include one or more services provided under Software as a Service (SaaS) category, Platform as a Service (PaaS) category, Infrastructure as a Service (IaaS) category, or other categories of services including hybrid services. In some embodiments, the services provided by cloud infrastructure system 202 may include, without limitation, application services, platform services and infrastructure services. In some examples, application services may be provided by cloud infrastructure system 202 via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 202 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 202 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by cloud infrastructure system 202 and also control the deployed services. In some embodiments, platform services provided by cloud infrastructure system 202 may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in cloud infrastructure system 202. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 202 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 202, and the like. In various embodiments, cloud infrastructure system 202 may be adapted to automatically provision, manage and track a customer's subscription to services offered by cloud infrastructure system 202. A customer, via a subscription order, may order one or more services provided by cloud infrastructure system 202. Cloud infrastructure system 202 then performs processing to provide the services in the customer's subscription order.

In one embodiment, as depicted in FIG. 2A, cloud management functionality may be provided by one or more modules, such as order management and monitoring module 214. These modules may include or be provided using one or more computers and/or servers, which may be general purpose computers, specialized server computers, server farms, server clusters, or any other appropriate arrangement and/or combination.

In exemplary operation, a customer using a client device, such as one or more of client computing devices 204, 206 or 208, may interact with cloud infrastructure system 202 by requesting one or more services provided by cloud infrastructure system 202. The customer may issue service requests 230 to cloud infrastructure system 202 using a variety of means. Service request 230 may include placing an order for a subscription for one or more services offered by cloud infrastructure system 202, accessing one or more services offered by cloud infrastructure system 202, or the like. In certain embodiments, the customer may access a cloud User Interface (UI), cloud UI 232, cloud UI 234 and/or cloud UI 236 and place a subscription order via these UIs. The order information received by cloud infrastructure system 202 in response to the customer placing an order may include information identifying the customer and information identifying one or more services offered by the cloud infrastructure system 202 to which the customer intends to subscribe. After an order has been placed by the customer, the order information is received via the cloud UIs, 232, 234 and/or 236.

In this example, order management and monitoring module 212 sends information received from a customer to an order database to have the order placed by the customer stored in recorded. The order database can be one of several databases operated by cloud infrastructure system 202 and operated in conjunction with other system elements. Order management and monitoring module 212 may forward information that includes all or part of the order information stored in the order database to an order management module. In some instances, the order management module may be configured to perform billing and accounting functions related to the order, such as verifying the order, and upon verification, booking the order.

Order management and monitoring module 212 may communicate all or part of the order information to an order orchestration module that utilizes the order information to orchestrate the provisioning of services and resources for the order placed by the customer. In some instances, the order orchestration module may orchestrate the provisioning of resources to support the subscribed services using the services of an order provisioning module.

In certain embodiments, the order orchestration module enables the management of business processes associated with each order and applies business logic to determine whether an order should proceed to provisioning. Upon receiving an order for a new subscription, the order orchestration module sends a request to the order provisioning module to allocate resources and configure those resources needed to fulfill the subscription order. The order provisioning module enables the allocation of resources for the services ordered by the customer. The order provisioning module provides a level of abstraction between the cloud services provided by cloud infrastructure system 202 and the physical implementation layer that is used to provision the resources for providing the requested services. The order orchestration module may thus be isolated from implementation details, such as whether or not services and resources are actually provisioned on the fly or pre-provisioned and only allocated/assigned upon request.

In certain embodiments, order management and monitoring module 212 manages and tracks a customer's subscription order. In some instances, order management and monitoring module 212 may receive information indicative of any provisioned services and/or resources associated with the customer. Order management and monitoring module 212 may be configured to collect usage statistics for the services in the subscription order, such as the amount of storage used, the amount data transferred, the number of users, and the amount of system up time and system down time.

Once services and resources are provisioned in the above example, service result 238 may be sent to customers on client computing devices 204, 206, and/or 208 informing the customer of the provided services and/or resources. In instances where service request 230 includes a request to access a service or have a service perform one or more operations, service result 238 may be send to customers on client computing devices 204, 206, and/or 208 providing the requested access or results of any operations, services performed, or data requested.

In certain embodiments, cloud infrastructure system 200 may include identity management module 214. Identity management module 214 may be configured to provide identity services, such as access management and authorization services in cloud infrastructure system 202. In some embodiments, identity management module 214 may control information about customers who wish to utilize the services provided by cloud infrastructure system 202. Such information can include information that authenticates the identities of such customers and information that describes which actions those customers are authorized to perform relative to various system resources (e.g., files, directories, applications, communication ports, memory segments, etc.) Identity management module 214 may also include the management of descriptive information about each customer and about how and by whom that descriptive information can be accessed and modified.

In certain embodiments, cloud infrastructure system 202 may also include infrastructure resources 216 for providing the resources used to provide various services to customers of cloud infrastructure system 202. In one embodiment, infrastructure resources 216 may include pre-integrated and optimized combinations of hardware, such as servers, storage, and networking resources to execute the services provided by the PaaS platform and the SaaS platform.

In some embodiments, resources in cloud infrastructure system 202 may be shared by multiple users and dynamically re-allocated per demand. Additionally, resources may be allocated to users in different time zones. For example, cloud infrastructure system 202 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 218 may be provided that are shared by different components or modules of cloud infrastructure system 202 and by the services provided by cloud infrastructure system 202. These internal shared services 218 may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, a number of external shared services 220 may be provided that are shared by different components or modules of cloud infrastructure system 202 and by the services provided by cloud infrastructure system 202. These external shared services 220 may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In various embodiments, external shared services 220 may include one or more components that provide access, data transformation, automation, or the like to enterprise computer system(s) 226. Access to enterprise computer system(s) 226 may be shared by different components or modules of cloud infrastructure system 202 and by the services provided by cloud infrastructure system 202. In some embodiments, access to enterprise computer system(s) 226 may be shared by service instances provided by cloud infrastructure system 202 that are restricted to one or more subscribers.

In further embodiments, external shared services 220 may include external application programming interface (API) services 228 that are shared by different components or modules of cloud infrastructure system 202 and by the services provided by cloud infrastructure system 202. These external API services 228 may include, without limitation, APIs provided by other third party services or entities.

Various different mobile cloud services may be provided by mobile cloud service (MSC) 222 in cloud infrastructure system 202. MCS 222 facilitates communication between a mobile computing device and enterprise computer systems (e.g., enterprise computer systems 224 and 226) according to some embodiments of the present invention. MCS 222 may include one or more memory storage devices ("local storage") used to store enterprise data and authentication information. Enterprise data may be received from enterprise computer systems 226 or from client computing devices 204, 206, or 208 or may include enterprise data converted by cloud infrastructure system 202, or combinations thereof. Authentication information may be received from identity management system 214 and/or generated by cloud infrastructure system 202. In some embodiments, authentication information may include information indicating security authentication of a user with regard to a request for a service.

Enterprise computer systems, such as enterprise computer systems 226 may be physically located beyond a firewall of cloud infrastructure system 202 at a different geographic location (e.g., remote geographic location) than cloud infrastructure system 202. In some embodiments, enterprise computer systems 226 may include one or more different computers or servers. In some embodiments, enterprise computer systems 226 may be part of a single computer system.

In certain embodiments, enterprise computer systems 226 may communicate with cloud infrastructure system 202 using one or more different protocols. Each of enterprise computer systems 226 may communicate with cloud infrastructure system 202 using a different communication protocols. Enterprise computer systems 226 may support the same or different security protocols. In some embodiments, MSC 222 may include an agent system to handle communication with enterprise computer systems 226.

A protocol may include a communication protocol, such as SPDY. A protocol may include an application protocol such as an HTTP-based protocol. In some embodiments, enterprise computer systems 226 may communicate with cloud infrastructure system 202 using a REST or SOAP communication protocols. For example, REST protocol may support a formats including URI or URL. Enterprise Data formatted for communication using REST protocol may be easily converted to data formats such as JSON, comma-separated values (CSV), and really simple syndication (RSS). Enterprise computer systems 226 and cloud infrastructure system 202 may communicate using other protocols such as remote procedure calls (RPC) (e.g., XML RPC).

In some embodiments, MCS 222 may include an adaptor interface configured to support communication with one or more services provided by cloud infrastructure service 202, some of which may support different protocols or techniques for communications. In some embodiments, MCS 222 may include an adaptor interface configured to support communication with enterprise computer systems 226, some of which may support different protocols or techniques for communications. MCS 222 may include one or more adaptors each of which may be configured to communicate according to a communication protocol, a type of enterprise computer system, a type of application, a type of service, or combinations thereof. A communication protocol supported by an adaptor may be specific to a service or one or more of enterprise computer systems 226.

In certain embodiments, client computing devices 204, 206, and 208 may each implement an application that can provide specific user interfaces to communicate with MCS 222. A specific UI may be configured to communicate using a specific communication protocol. In some embodiments, specific UIs may include callable interfaces, functions, routines, methods, and/or operations that may be invoked to communicate with MCS 222. Specific UIs may accept as input parameters for communicating with a service provided by cloud infrastructure service 202 or with enterprise computer systems 226 for enterprise data and/or to request a service. In some embodiments, communication through MCS 222 may be converted for communication using a custom communication protocol. In some embodiments, specific UIs may correspond to a custom client in an application.

MCS 222 may include one or more callable interfaces, e.g., an application programming interface (API). Callable interfaces associated with MCS 222 may enable an app on a mobile computing device to communicate requests to MCS 222. Callable interfaces associated with MCS 222 may support a common or standard interface, which may allow requests including their parameters to be received from apps according to a standardized protocol, architectural style, and/or format (e.g., a REST protocol). Callable interfaces associated with MCS 222 may be configurable by a user of any one of computing devices 204, 206, or 208. Callable interfaces associated with MCS 222 may receive requests for services according to a communication protocol. Device application developers can connect to MCS 222 for their custom applications. In some embodiments, a callable interface associated with MCS 222 may be configured by the same person that develops an app, such that the person can implement a custom app to communicate with MCS 222.

Callable interfaces associated with MCS 222 may further enable enterprise computer systems 226 to communicate with MCS 222 according to a standardized protocol or format. Similar to application developers, those who manage enterprise computer systems can implement code (e.g., an agent system) that is configured to communicate with MCS 222 via one or more callable interfaces. Callable interfaces associated with MCS 222 may be implemented based on a type of a computing device, a type of enterprise computer systems, an app, an agent system, a service, a protocol, or other criterion. In some embodiments, callable interfaces associated with MCS 222 may support requests for services including authentication, compression, encryption, pagination with cursors, client-based throttling, non-repudiation, logging, and metrics collection. In some embodiments, callable interfaces associated with MCS 222 may be implemented for custom business-related services, such as authentication, policy enforcement, caching of responses, throttling of calls to MCS 222, translation between asynchronous and synchronous patterns, logging of calls to underlying services, or combinations thereof. In some embodiments, callable interfaces associated with MCS 222 may enable users to load custom code for implementation by cloud infrastructure system 202. The custom code may implement one or more callable interfaces associated with MCS 222 for cloud infrastructure system 202, which can enable users to access custom services or other enterprise computer systems.

Protocol translators associated with MCS 222 may process a message to determine a communication protocol for a message and/or to convert a message to a communication protocol for a destination. Protocol translators associated with MCS 222 may convert a request received from client computing devices 204, 206, or 208. The request may be converted from a format of a communication protocol supported by client computing devices 204, 206, or 208 to a format of a communication protocol supported by a service provided by cloud infrastructure service 202 or enterprise computer systems 226. Protocol translators associated with MCS 222 may convert a response received from a service provided by cloud infrastructure service 202 or enterprise computer systems 226. A response may be converted from a format of a communication protocol supported by a service provided by cloud infrastructure service 202 or enterprise computer systems 226 to a format of a communication protocol supported by client computing devices 204, 206, or 208.

Security services associated with MCS 222 may manage security authentication for requests received from any of client computing devices 204, 206, or 208. Security services associated with MCS 222 may protect the integrity of customer processes and enterprise data. To prevent system or data from being compromised, security authentication may occur when a request is received from client computing devices 204, 206, or 208. Security authentication may be performed before a request is dispatched for processing by cloud infrastructure system 202. The security authentication determined for a user may enable a user associated with a mobile computing device to have authorization to request services via MCS 222. The security authentication may reduce efforts for a user to authenticate for different requests and/or services requested via MCS 222. Security services associated with MCS 222 may be implemented as one or more functional blocks or modules configured to perform various operations authenticating security of a request.

Authentication services associated with MCS 222 may manage security authentication for requests received from client computing devices 204, 206, or 208. Authentication services associated with MCS 222 may determine security authentication for a user associated with a computing device that sends a request to MCS 222. Security authentication may be determined based on a time period, which may be tied to operation of an app (e.g., launching an app), a request, a computing device, an enterprise computer system, other criterion related to a request, or combinations thereof. Security authentication may be verified and granted for any one of the following, such as an individual request, one or more enterprise computer systems, a particular service, a type of service, a user, a computing device, other criterion for determining security authentication, or combinations thereof. In some embodiments, cloud infrastructure system 202 may store authentication information of users received from enterprise computer systems or authentication systems supporting enterprise computer systems. Cloud infrastructure system 202 may determine authentication by performing a lookup function to determine whether an identity of a user associated with a request has authority to make such a request. The stored authentication information may include information such as the type of requests, functions, enterprise computer systems, enterprise data, or the like that a user may be authorized to access. In some embodiments, infrastructure system 202 may initiate communication with a requesting computing device to determine authentication.

In some embodiments, security authentication may be determined based on a role associated with a user requesting a service. The role may be associated with a user requesting access to MCS 222. In some embodiments, a user may request services as a subscriber or tenant of MCS 222 who may be granted access to resources and/or services provided by MCS 222. Authentication may correspond to a user's subscription to MCS 222, such that a user may be authorized to request services via MCS 222 as a subscriber. In some embodiments, the subscription may be limited to a particular set of resources provided by MCS 222. Security authentication may be based on the resources and/or services accessible to the user of MCS 222. In some embodiments, a request may be provisioned a template during execution called a "runtime environment." The runtime environment may be associated with resources that are allocated for a request, a user, or a device.

In some embodiments, authentication services associated with MCS 222 may request an identity management system to determine security authentication for the user. The identity management system may be implemented by cloud infrastructure system 202 (e.g., as identity management 214) or by another computer system that is external to cloud infrastructure system 202. Identity management 214 may determine security authentication of the user based on the user's role or subscription for accessing MCS 222. The role or subscription may be assigned privileges and/or entitlements with respect to an enterprise computer system, a service provided by an enterprise computer system, a function or feature of an enterprise computer system, other criterion for controlling access to an enterprise computer system, or combinations thereof.

Various different application development frameworks (ADFs) may be provided by application development frameworks (ADFs) 224 in cloud infrastructure system 202. ADFs 224 provide the infrastructure code to implement agile SOA based applications. ADFs 224 further provide a visual and declarative approach to development through one or more development tools (e.g., Oracle JDeveloper 11 g development tool). One or more frameworks provided by ADFs 224 may implement a Model-View-Controller design pattern. Such frameworks offer an integrated solution that covers all the layers of the MVC architecture with solutions to such areas as Object/Relational mapping, data persistence, reusable controller layer, rich Web user interface framework, data binding to UI, security and customization. Extending beyond the core Web based MVC approach, such frameworks also integrate with the Oracle SOA and WebCenter Portal frameworks simplifying the creation of complete composite applications.

In certain embodiments, ADFs 224 make it easy to develop agile applications that expose data as services by coupling a service interface to built-in business services provided by cloud infrastructure system 202. This separation of business service implementation details is performed in ADFs 224 via metadata. Use of this metadata-driven architecture enables application developers to focus on the business logic and user experience, rather than the details of how services are accessed. In certain embodiments, ADFs 224 store implementation details of services in metadata in a model layer. This enables developers to exchange services without modifying the user interface, making the application extremely agile. Additionally, the developer creating the user interface does not need to bother with business service access details. Instead, developers can focus on developing the application interface and interaction logic. Creating the user experience can be as simple as dragging-and-dropping the desired business services onto a visual page designer and indicating what type of component should represent that data.

In various embodiment, developers interact with ADFs 224 to create modules forming enterprise applications. The enterprise applications can be executed within the context of cloud infrastructure system 202. In various embodiments, developers interact with ADFs 224 to create modules forming mobile applications. The mobile applications can be executed within the context of cloud infrastructure system 202. Features of the present invention described below may be implemented using any desired combination of programming language and application development framework as will be apparent to one skilled in the relevant arts by reading the disclosure provided herein.

One or more frameworks provided by ADFs 224 may be embodied as Oracle ADF in one example. Accordingly, a framework in ADFs 224 can be based on a Model-View-Controller (MVC) design pattern. An MVC application is separated into: 1) a model layer that handles interaction with data-sources and runs the business logic, 2) a view layer that handles the application user interface, and 3) a controller that manages the application flow and acts as the interface between the Model and the View layers. Separating applications into these three layers simplifies maintenance and reuse of components across applications. The independence of each layer from the others results in a loosely coupled, Service Oriented Architecture (SOA).

In various embodiments, ADFs 224 provide tools and resources allowing developers to create an application in the form of multiple layers, each layer containing code modules/files implementing desired logic according to pre-defined specification. Thus, in one embodiment, ADFS 224 enables the application to be developed as four layers: a view layer containing code modules/files that provide the user interface of the application, a controller layer containing code modules that control the flow of the application, a model layer containing data/code modules that provide an abstraction layer for the underlying data, and a business services layer containing code modules that provide access to data from various sources and handles business logic.

In certain embodiments, ADFs 224 let developers choose the technology they prefer to use when implementing each of the layers. EJB, Web Services, JavaBeans, JPA/EclipseLink/TopLink objects, and many others can all be used as Business Services for ADFs 224. View layers can include Web based interfaces implemented with JSF, Desktop Swing applications and MS Office front ends, as well as interfaces for mobile devices.

In one aspect, the view layer represents the user interface of the application being developed. The view layer can include desktop, mobile, and browser-based views, each of which provides all or a portion of the user interface and is accessible in a variety of manners corresponding to view type. For example, web pages may be sent by the application in response to receiving client requests containing corresponding URLs. The web pages may then be displayed by a browser on a display unit (not shown) associated with a requesting client system, thereby enabling users of the requesting client system to interact with the enterprise application. ADFs 224 support multi-channel access to business services allowing reuse of business services and access from a Web client, a client-server swing desktop-based application, Microsoft Excel spreadsheets, mobile devices such as a smart-phone, or the like.

The code files/modules forming the view layer (such as web pages) may be implemented using one or more of hypertext markup language (HTML), Java server pages (JSP), and Java Server Faces (JSF). Alternatively, the user interface may be implemented using Java components such as Swing, and/or extensible markup language (XML). As further noted, the user interface may leverage a user's experience and familiarity with desktop applications, such as Word and Excel by Microsoft.

As noted above, the relevant user-developed code/data modules are provided in each of the layers. However, each layer typically contains other pre-defined code/data modules provided by ADFs 224. Some of the pre-defined modules may be used during development, for example, as templates for developing the web pages, for including desired functionality in the developed code etc. Other pre-defined modules (such as a URL rewriting module) may be deployed along with the developed application and may provide additional functionalities (mapping of requested URLs to internal names) to the user during execution of the enterprise application.

A controller layer contains code modules/files that control the flow of the application. Each controller object contains software instructions and/or data implemented according to a desired manner of presenting information in the view layer. The desired manner may include the specific web pages to be displayed when links in another web page are clicked/selected by the user, the page to be displayed when errors occur during execution, indicating the specific data to be stored/retrieved, etc.

In one aspect, the controller layer manages the applications flow and handles user input. For example, when a Search button is clicked on a page, the controller determines what action to perform (do a search) and where to navigate to (the results page). There are two controller options for web-based applications in JDeveloper: the standard JSF controller or the ADF Controller that extends the JSF controller functionality. Whichever controller is used, application flow is typically designed by laying out pages and navigation rules on a diagram. An application's flow can be broken into smaller, reusable task flows; include non-visual components such as method calls and decision points in a flow; and create "page fragment" flows that run inside a region of a single containing page.

The code modules/files forming the controller layer are often implemented as Java servlets receiving the client requests and sending desired web pages as corresponding responses. Controller objects may also be implemented, for example, as Apache Jakarta Struts controllers or according to the JSF standard.

A model layer contains data/code modules that connect various business services to the objects that use them in the other layers, such as to the controller objects discussed above or directly to desktop applications as shown. Each abstract data objects of the model layer provides a corresponding interface that can be used to access any type of business service, executing in an underlying business service layer. The data objects may abstract the business service implementation details of a service from a client and/or expose data control methods/attributes to view components, providing a separation of the view and data layers.

In one aspect, the model layer consists of two components, data controls and data bindings, which utilize metadata files to define the interface. Data controls abstract the business service implementation details from clients. Data bindings expose data control methods and attributes to UI components, providing a clean separation of the view and model. Due to the metadata architecture of the model layer, developers get the same development experience when binding any type of Business Service layer implementation to the View and Controller layers.

In certain embodiments, ADFs 224 emphasizes the use of the declarative programming paradigm throughout the development process to allow users to focus on the logic of application creation without having to get into implementation details. At a high level, the development process for a Fusion web application usually involves creating an application workspace. Using a wizard, libraries and configuration needed for technologies selected by a developer are automatically added and an application is structured into projects with packages and directories.

By modeling database objects, an online database or offline replica of any database can be created, definitions edited, and schemas updated. Using an UML modeler, use cases can then be created for the application. Application control and navigation can also be designed. Diagrammers can be used to visually determine the flow of application control and navigation. Then, an underlying XML file describing the flow can be automatically created. A resource library can be used to allow a developer to view and use imported libraries by simply dragging and dropping them into the application. From database tables, entity objects can be created using wizards or dialogs. From those entity objects, view objects are created to be used by pages in the application. Validation rules and other types of business logic can be implemented.

In this example, a business services layer manages interaction with a data persistence layer. It provides such services as data persistence, object/relational mapping, transaction management, and business logic execution. The business services layer can be implemented in any of the following options: as simple Java classes, EJB, Web services, JPA objects, and Oracle ADF Business Components. In addition, data can be consumed directly from files (XML or CSV) as well as REST. Thus, each business service manages interaction with a corresponding data persistence layer, and also provides such services as object/relational mapping, transaction management, business logic execution, etc. The business services layer may be implemented using one or more of simple Java classes, Enterprise Java Beans, web services, etc.

Business components represent a business service implemented using, for example, Oracle ADF Business Components, to provide interaction with databases, web services, legacy systems, application servers, and the like. In one embodiment, business components of the business services layer contain a mixture of application modules, view/query objects, and entity objects, which cooperate to provide the business service implementation. An application module can be a transactional component/code module that UI clients communicate with for working with application/transaction data. The application module may provide an updatable data model and also procedures/functions (commonly referred to as service methods) related to user transactions.

An entity object may represent a corresponding row in a database table and simplifies the manipulation (update, deletion, etc.) of the data stored in the corresponding row. An entity object often encapsulates business logic for the corresponding row to ensure that the desired business rules are consistently enforced. An entity object may also be associated with other entity objects to reflect relationships existing between rows stored in the underlying database.

Figure 2B:
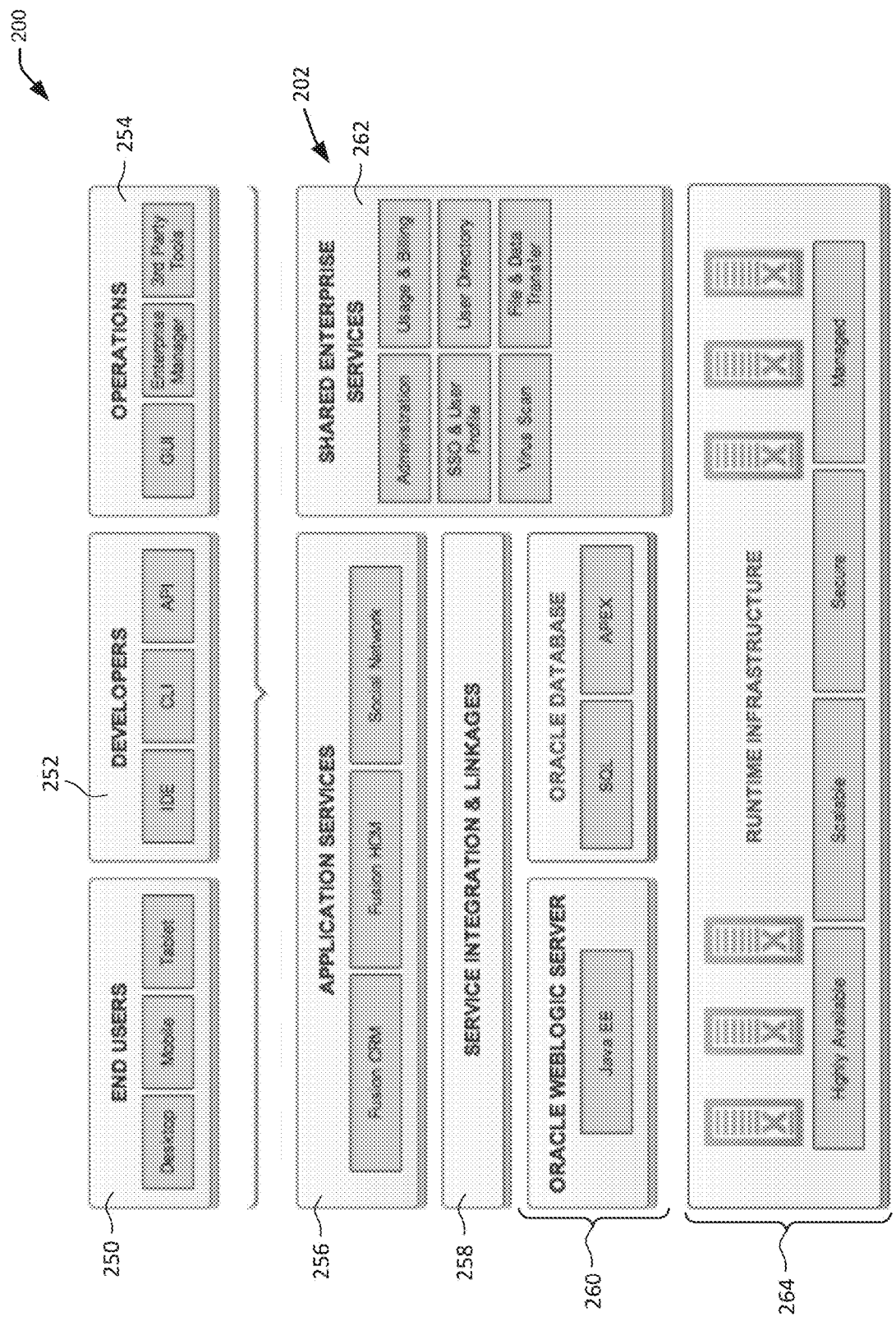
FIG. 2B is a simplified block diagram of a hardware/software stack that may be used to implement a cloud infrastructure system, according to one or more embodiments of the present invention.

Referring now to FIG. 2B, an example block diagram of a hardware/software stack that may be used to implement the computing environment 200 and/or cloud infrastructure system 202 discussed above, according to various embodiments of the present invention. It should be appreciated that alternative hardware/software stacks may be implemented having components other than those depicted in FIG. 2B. Further, the example shown in FIG. 2B is only one example of a cloud infrastructure system that may be used to implement embodiments of the invention. In some other embodiments, cloud infrastructure system 200 may have more or fewer components than shown in FIG. 2B, may combine two or more components, or may have a different configuration or arrangement of components. In certain embodiments, the hardware and software components are stacked so as to provide vertical integration that provides optimal performance.

Various types of users may interact with cloud infrastructure system 202. These users may include, for example, end users 250 that can interact with cloud infrastructure system 202 using various client devices such as desktops, mobile devices, tablets, and the like. The users may also include developers/programmers 252 who may interact with cloud infrastructure system 202 using command line interfaces (CLIs), application programming interfaces (APIs), through various integrated development environments (IDEs), and via other applications. User may also include operations personnel 254. These may include personnel of the cloud service provider or personnel of other users.

Application services layer 256 identifies various cloud services that may be offered by cloud infrastructure system 202. These services may be mapped to or associated with respective software components 260 (e.g., Oracle WebLogic server for providing Java services, oracle database for providing database services, and the like) via a service integration and linkages layer 258.

In certain embodiments, a number of internal services 262 may be provided that are shared by different components or modules of cloud infrastructure system 202 and by the services provided by cloud infrastructure system 202. These internal shared services may include, without limitation, a security and identity service, an integration service, an enterprise repository service, an enterprise manager service, a virus scanning and white list service, a high availability, backup and recovery service, service for enabling cloud support in IDEs, an email service, a notification service, a file transfer service, and the like.

Runtime infrastructure layer 264 represents the hardware layer on which the various other layers and components are built. In certain embodiments, runtime infrastructure layer 264 may comprise one Oracle's Exadata machines for providing storage, processing, and networking resources. An Exadata machine may be composed of various database servers, storage Servers, networking resources, and other components for hosting cloud-services related software layers. In certain embodiments, the Exadata machines may be designed to work with Oracle Exalogic, which is an engineered system providing an assemblage of storage, compute, network, and software resources. The combination of Exadata and Exalogic provides a complete hardware and software engineered solution that delivers high-performance, highly available, scalable, secure, and a managed platform for providing cloud services.

Figure 3:
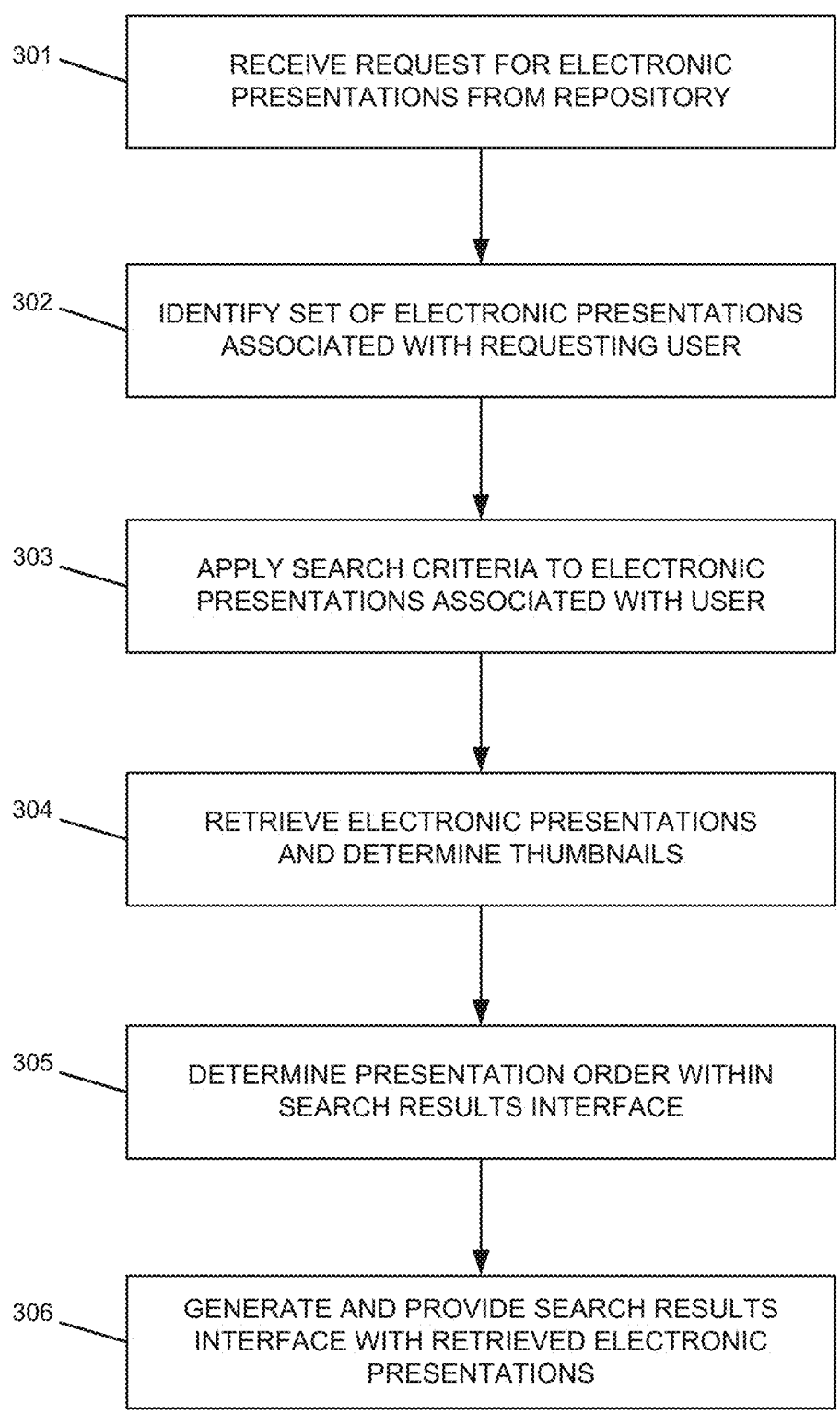
FIG. 3 is a flowchart illustrating a process for generating and providing a search results interface for electronic presentations within a storage repository, according to one or more embodiments of the present invention.

Referring now to FIG. 3, a flowchart is shown illustrating a process for generating and providing a search results interface for electronic presentations within a storage repository. As described below, the steps in this process may be performed by one or more components in the computing environment 100 described above (and/or cloud services-based system 200), such as the electronic presentation interface engine 120 configured to provide search and presentation capabilities and/or one or more storage repositories 130. Additionally, in some embodiments, certain steps in this process may be performed within client devices 110, data source devices/servers 140, and/or by other various intermediary devices. It should further be understood that the techniques described herein, such as the electronic presentation storage and management techniques, and the customized search and presentation capabilities described herein, need not be limited to the specific system and hardware implementations described above, but may be performed within other hardware and system environments comprising other combinations of the hardware, software, and network components.

As noted above, certain aspects described herein relate to storing user-specific cover slide selections, generating user-specific thumbnail for search results interfaces. Therefore, in some embodiments, prior to performing the steps in FIG. 3, a number of electronic presentations may be uploaded into a storage repository 130, and one or more users may have designated a cover slide for one or more of the presentations stored in the repository 130. As discussed in more detail below, when a user designates a cover slide within an electronic presentation, that slide may be used as the basis for a thumbnail to represent the presentation within a search results interface. Several different techniques may be implemented to allow users to designate cover slides. The techniques available within an embodiment may depend on the specific presentation software and document format used (e.g., Microsoft PowerPoint®, Apple Keynote®, Google Slides®, Prezi®, etc.) as well as the operating system, and interfaces and/or client tools implemented within the client devices 110, electronic presentation interface engine 120, and/or storage repository 130. For example, users may designate cover slides directly from within the presentation software in some cases, while in other cases may use separate client tools implemented within the electronic presentation interface engine 120 or repository 130 which operate outside of (and without instantiating) the electronic presentation software.

Figure 4:
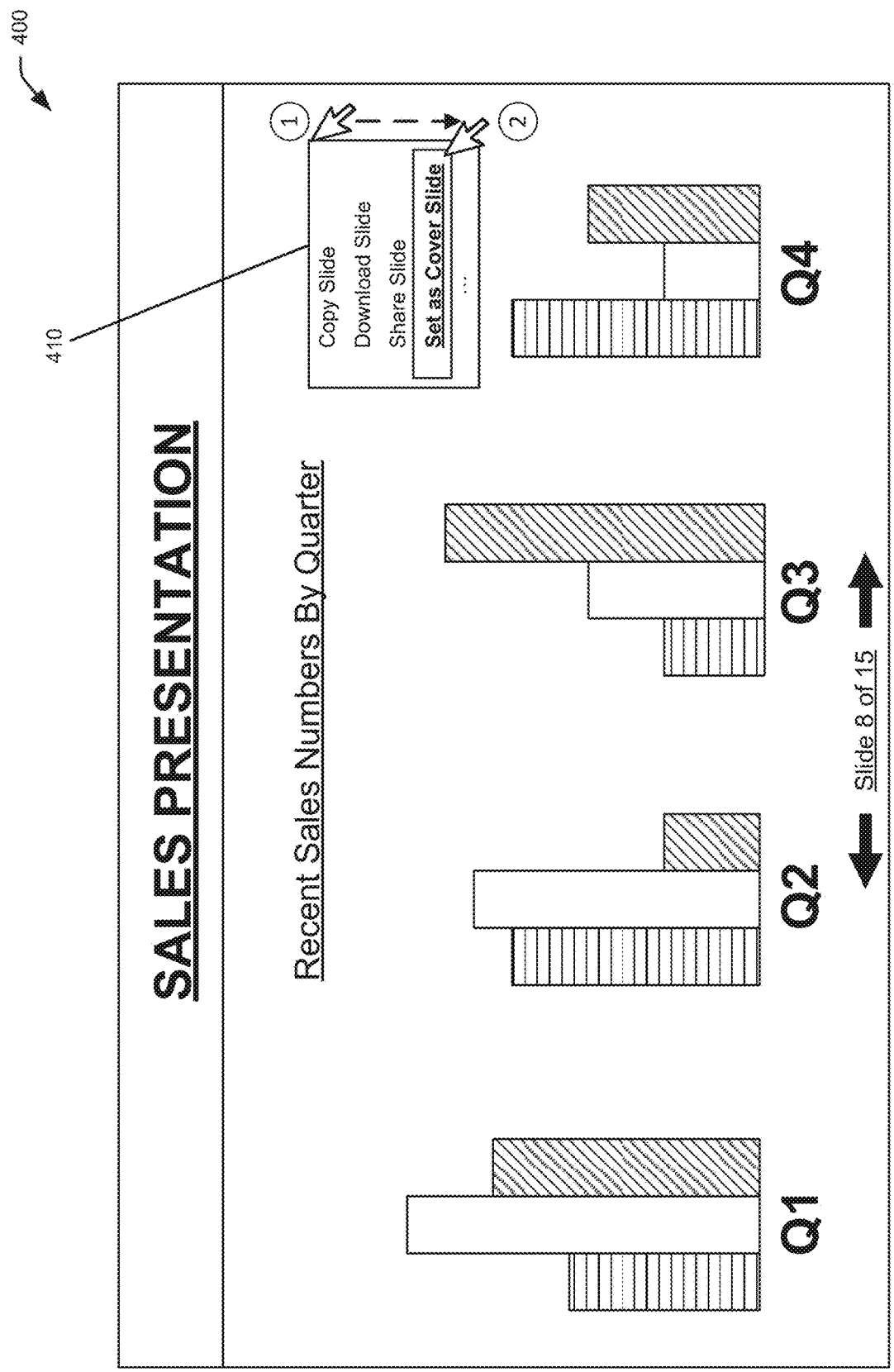
FIG. 4 is an example screen within an illustrative user interface of an electronic presentation program, according to one or more embodiments of the present invention.

Referring briefly to FIG. 4, an example screen user interface screen is shown allowing a user to designate a cover slide from within an electronic presentation software program. In this example, an electronic presentation program has been instantiated and is displaying a presentation within a user window 400. The presentation program shown in this example may correspond to any type of electronic presentation software, and may include various different features incorporated into such software allowing users to create, access, modify, and execute electronic presentations. Additionally, in this example, the presentation program window 400 provides a menu 410 allowing the user to perform various actions on the currently displayed slide. In this case, the user may invoke a floating sub-menu 410 by clicking (or right-clicking, double-clicking, etc.) at position 1 in window 400. The user then may designate the current slide as the cover slide by selecting the appropriate option in the menu 410 and clicking at position 2. As shown in this example, similar techniques may be implemented to allow the user to copy, download, and share the current slide, along with other various options described herein. Using such techniques, a user may designate a cover slide for any presentations owned by the user, as well as any other presentation accessible to the user. Moreover, as described below in more detail, different users may designate different cover slides for the same presentation.

Returning to FIG. 3, in step 301, a search request may be received to access a set of electronic presentations from one or more storage repositories 130. For example, a search request in step 301 may be initiated by a user at a client device 110, via a web browser or other client-based application, and received at one or more servers corresponding to an electronic presentation interface engine 120 configured to provide and/or support the client application. In some cases, the search request received in step 301 may correspond to a user simply accessing a universal resource locator (URL), file share, or root-level folder in a storage repository 130. In other cases, the search request received in step 301 may include one or more additional search criteria provided by the user, and/or one or more sorting criteria indicating the order in which the search results should be arranged and presented to the user within the search interface. Such search criteria and sorting criteria may include any combination of well-known document properties, including without limitation, file name, file type, date created, date last modified, date last accessed, file creator, file owner, file size, etc.

In addition to well-known and common document properties, certain embodiments may support search criteria and/or sorting criteria based on additional properties relating to the usage and access of presentation documents within the repository 130. For example, the electronic presentation interface engine 120 and/or repositories 130 may track and store various access and usage statistics for the electronic presentations within repositories 130, and such usage statistics data may be used as search criteria and sorting criteria in some embodiments. Additionally, certain embodiments may support advance text searches of electronic presentations within the repository 130, based on text within presentation titles, text within individual slides, and/or text within the properties or metadata of the presentations in the repository 130.

Figure 5:
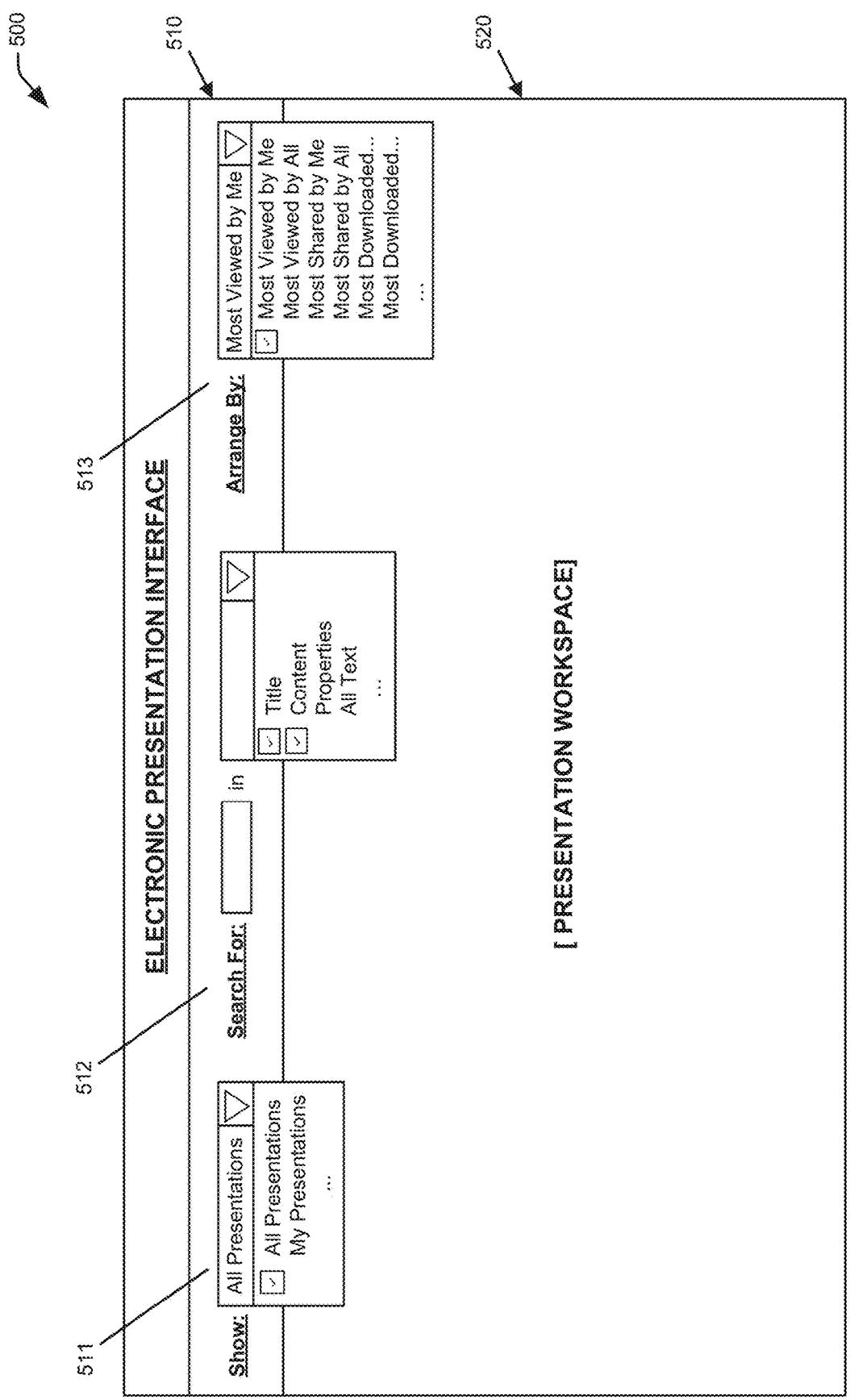
FIG. 5 is an example screen within an illustrative user interface configured for searching electronic presentations within a storage repository, according to one or more embodiments of the present invention.

For example, referring briefly to FIG. 5, an example user interface screen is shown of an electronic presentation search interface. In this example, an electronic presentation search interface screen 500 includes a search request region 510 and a presentation workspace region 520 in which the retrieved search results may be displayed. In this example, the search request region 510 includes three separate search/sorting elements: a search by presentation owner 511, an advance text search 512, and a sorting feature based on usage statistics 513. For example, using element 511, the user may specify which electronic presentations in the repository should be searched. In this cases, the user may elect to search only those presentations owned by the user, or all presentations within the repository 130 to which the user has at least read-only level access. Using element 512, the user may optionally provide one or more text strings to use as search criteria for searching electronic presentations within the repository 130. Additionally, the user may specify whether the text strings provided as input should be compared against the presentation title, the presentation slide content, the presentation metadata/properties, or all text associated with the presentation. Using element 513, the user may identify one or more sorting criteria to be used for arranging and presenting the retrieved search results within the workspace region 520. In this example, the user may elect to arrange the search results by based on the number of times the retrieved presentations have been viewed, the number of times the retrieved presentations have been shared, and/or the number of times the retrieved presentations have been downloaded. In each case, the user may select user-specific sorting criteria (e.g., the user's own previous views, shares, and downloads), or may base the sorting criteria on the access and usage activities of all users.

It should be understood that the examples of search criteria and sorting criteria shown in FIG. 5 are illustrative only and non-limiting. In other embodiments, any possible combination of search criteria, including document properties, document access credential data (e.g., document owner, sharers, sharees, etc.), and/or document access and usage statistics may be used as search criteria for retrieving presentation documents from the repository 130 and/or as sorting criteria for arranging the presentation of documents within the search interface. For instance, advance text searching elements such as 512 may be used to determine sorting criteria as well as (or in addition to) searching criteria, and usage statistics criteria such as 513 may be used to as searching criteria as well as (or in addition to) determining sorting criteria. Additionally, it should be understood that any other data fields described herein relating to electronic presentation documents also may be used for searching criteria and/or sorting criteria.

In step 302, a set of electronic presentation documents within the storage repository 130 may be identified which are associated with the user that initiated the request in step 301. One or more servers may identify the set of associated documents in step 502 by initiating requests to storage repositories 130 based on the user's identity and/or authorization credentials. In some cases, the set of presentation documents identified in step 302 may include the documents for which the user is an owner, documents for which the has been granted access permissions (e.g., read and/or write permissions by the owner, and all public documents within the repository 130. As noted above, in some embodiments, an electronic document storage repository 130 may include multiple different storage systems (e.g., databases, file systems) residing on multiple different servers and/or data centers at remote locations. In such embodiments, identifying a user's associated presentation documents in step 302 may include one or more requests to data storage system/servers within the repository 130. Different storage systems/servers in repository 130 may implement different secure authentication techniques and protocols, and thus the electronic presentation interface engine 120 may be configured to implement multiple different security techniques and protocols as required.

In step 303, the search criteria provided with the search request in step 301 (if any) may be applied to the set of presentation documents identified in step 302. As noted above, providing specific search criteria may be optional, and in some cases a search request may correspond to a user accessing a URL, file share, folder, etc., without any additional criteria. However, when additional search criteria are provided, they may be evaluated against the corresponding data for the electronic presentation documents retrieved in step 302. Examples of various types of search criteria are discussed above in reference to FIG. 5, and described elsewhere herein.

Various types of search criteria that may be applied in step 303 include document properties (e.g., file name, file type, date created, date last modified, date last accessed, file creator, file owner, file size, etc.), document ownership and access credential data (e.g., document owner, document sharers, document sharees, etc.), and/or document access and usage statistics (e.g., numbers of document views, document shares, document downloads, as well as the users associated with these document access and usage actions). To determine the electronic presentations satisfying the search criteria, the corresponding document properties, access credential data, usage statistics, etc., for all presentation documents associated with the user may be retrieved and compared to the search criteria received in step 301. As discussed above, presentation document properties and other presentation document information (e.g., document access permissions, usage statistics, etc.) may be stored in various different formats and locations within the repository 130, the servers of the electronic presentation interface engine 120, and/or other external data sources. For example, certain properties/associated information may be stored within the electronic presentation documents themselves in the storage repository 130 as document properties or metadata. Other document properties/associated information may be stored in separately from the presentation documents in storage tables and/or data stores within the storage repository 130 or other storage systems.

For example, referring briefly to FIGS. 6A and 6B, two example data tables are shown for storing electronic presentation properties and usage/access data. Specifically, table 600a in FIG. 6A corresponds to a properties data listing an illustrative and non-limiting set of properties that may be maintained for electronic presentation documents stored within the storage repository 130. Table 600b in FIG. 6B shows an example table containing sample access/usage statistics and customization data for a set of electronic presentations associated with a single user (User A). In this example, for each of User A's associated presentation (e.g., presentations owned by User A or otherwise accessible to User A), table 600b may store the type and level of access to the presentation by User A, the number of times User A has viewed, shared, and downloaded each presentation, and the cover slide designated by User for each presentation. As discussed above, document properties and associated information such as the data in tables 600a and 600b may be stored within the electronic presentation documents themselves, or in separate storage structures and/or storage systems within the repository 130 or within external data servers.

Additionally, although the above examples only describe storing and using document permissions/authentication data and document access/usage statistics on a presentation level, in other examples, corresponding slide-level data may be tracked, stored, and used to implement similar customization searching and presentation capabilities. For example, for each electronic presentation in the repository 130, per-slide views data, per-slide shares, per-slide downloads, etc., may be tracked and stored within the repository 130 and/or other external data systems. The per-slide data then may be used for searching criteria and/or sorting criteria using similar techniques to those described herein. For instance, users via client devices 110 may perform searches for individual slides within electronic presentations, based on the number of times the user (or all users) have accessed the slide, modified the slide, shared the slide, downloaded the slide, and the like. Additionally, per-slide user access permissions and authentication may be implemented in some examples.

In step 304, a thumbnail may be determined and/or generated for each electronic presentation document to be presented in the search results interface. For example, for each of the electronic presentation documents identified in step 302 which satisfy the (optional) search criteria in step 303, the electronic presentation interface engine 120 may retrieve a thumbnail image from the storage repository 130 and/or generate a new thumbnail as required. In illustrated in the examples described herein, a thumbnail may refer to a small graphical image or other content used to represent an electronic presentation document within a graphical user interface such as a folder view or a search results interface.

The thumbnails determined in step 304 may be user-specific, meaning that different thumbnails may be determined for the same presentation when that presentation is retrieved by different users. For example, as shown in FIG. 6B, a set of user-specific thumbnail data may be stored corresponding to the presentation documents that are accessible to the individual user. Each different user may designate a different cover slide for an electronic presentation, as described above in reference to FIG. 4, which may cause different thumbnails to be retrieved and/or generated in step 304 depending on the user that initiated the request in step 301.

Figure 7:
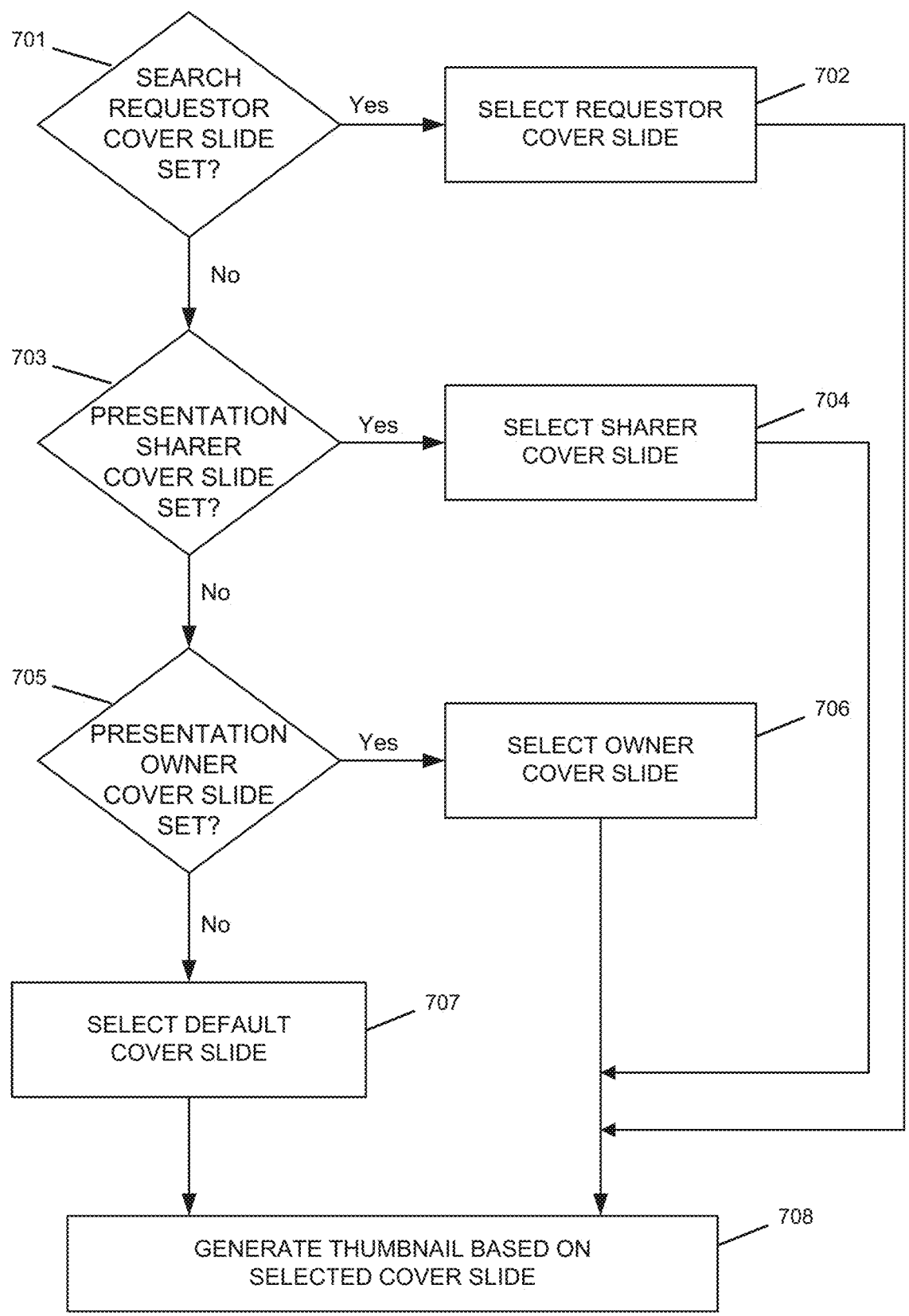
FIG. 7 is flowchart illustrating a process for determining a selected cover slide and generating a corresponding thumbnail for an electronic presentation, according to one or more embodiments of the present invention.

Referring now to FIG. 7, an example process is shown for determining a selected cover slide and generating a corresponding thumbnail for an electronic presentation. The process shown in FIG. 7 illustrates one possible implementation of a user-specific cover slide determination that may be performed in step 304, for example, by an electronic presentation interface engine such as the search interface component 122 and/or additional components within the electronic presentation interface engine 120. As discussed below, in this example, the cover slide that should be rendered as a thumbnail within the search results interface may be determined based by querying, in order, a requestor cover slide, sharer cover slide, and then owner cover slide for the electronic presentation. It should be understood that this example is illustrative and non-limiting, and in other examples different techniques may be used to determine user-specific cover slides.

In step 701, the servers of the electronic presentation interface engine 120 may determine whether or not a cover slide has been designated by (or for) the user that initiated the search request in step 301. For example, the search interface component 122 may retrieve the previous-stored user data such as that shown in table 600b in FIG. 6B, indicating designations of cover slides associated with the requesting user (User A). In this example, if a requestor has designated a cover slide for an electronic presentation, that designated cover slide is given priority over any other potential cover slide. Therefore, if a designated cover slide associated with the requestor can be identified (701:Yes), then in step 702 the designated cover slide may be selected and/or retrieved to be used as the thumbnail in the search results interface.

If the user that initiated the search request has not designated a cover slide for the electronic presentation (701:No), then in step 703 the servers of the electronic presentation interface engine 120 may perform a similar process to determine if the user that originally shared the electronic presentation with the requestor has designated a cover slide for the presentation. It should be understood that this step may be optional in some cases, for example, for publicly accessible presentations or other presentations that were not expressly shared with the user by a sharer. However, in this example, if the electronic presentation was shared with the user by another user, and that sharer has designated a cover slide for the presentation (703:Yes), then in step 704 the sharer's designated cover slide may be selected and/or retrieved to be used as the thumbnail in the search results interface for the sharee.

If neither the user initiating the search request nor the sharer user has designated a cover slide for the electronic presentation (701:No), then in step 705 the servers of the electronic presentation interface engine 120 may perform a similar process to determine if the owner(s) of the electronic presentation document have designated a cover slide for the presentation. If the document owner(s) have designated a cover slide for the presentation (705:Yes), then in step 706 the owner's designated cover slide may be selected and/or retrieved to be used as the thumbnail in the search results interface for the user that initiated the search request in step 301. If not (705:No), then in step 707 a default cover slide may be selected and/or retrieved to be used as the thumbnail in the search results interface. In some cases, the default cover slide may be determined by a particular slide number within the presentation (e.g., the first slide). In other cases, the default cover slide may be determined by the usage statistics accumulated by the system 100, for example, the most viewed slide, most modified slide, most shared slide, or most downloaded slide. The techniques used to select a default slide may be configurable via the electronic presentation interface engine 120.

In step 708, after a designated cover slide has been selected either in step 702, 702, 706, or 707, a thumbnail based on the selected cover slide may be retrieved and/or generated by the electronic presentation interface engine 120. In some examples, a previously-generated thumbnail image may be retrieved from storage within the electronic presentation interface engine 120 and/or repository 130. In other examples, the electronic presentation document may be accessed dynamically (i.e., subsequent to receiving the search request in step 301), and a thumbnail image may be generated on-the-fly based on the selected cover slide. Additionally, in some embodiments, new thumbnail images may be generated on-the-fly and/or updated periodically in response to modifications to the electronic presentations. Thus, subsequent search requests initiated by the same user may cause the retrieval and/or generation of a different thumbnail for the same presentation in several situations. For example, if the user designates a different cover slide for a presentation, or if the sharer or owner designates a different cover slide, or if a different default cover slide is used, or if the content of a designated cover slide (or default cover slide) has been modified by the user or any other user, then any of these situations may potentially cause a different thumbnail to be retrieved and/or generated in step 304.

As noted above, the thumbnail retrieved and/or generated in step 304 may be thumbnail image corresponding to the designated (or default) cover slide. Such thumbnail images may be, for example, smaller sized and lower resolution copies of the cover slide that may be rendered within a search interface results screen. In some examples, rather than a thumbnail image, the thumbnail retrieved and/or generated in step 304 might be a thumbnail video or thumbnail animation. For instance, if the electronic presentation interface engine 120 determines that a selected cover slide has moving graphical elements (e.g., moving shapes, text, pictures, effects, etc.), then the server engine 120 may generate a corresponding low-resolution thumbnail animation in step 304 to correspond to the movement graphical elements within the slide. Similarly, if the electronic presentation interface engine 120 determines that the selected cover slide includes an embedded video, then the server engine 120 may generate a corresponding low-resolution thumbnail video to be displayed within a search interface results screen.

The user-specific designations of cover slides for electronic presentations, such as those discussed in above examples, may be performed by individual users for some or all of their owned and other association presentations. As noted above, different users may designate different cover slides for the same presentation, so that each user's selected cover slide may be used as the thumbnail slide within the search interface results for each user's respective search requests. In some cases, user-specific thumbnail designations such as those shown in FIG. 6B may be stored as a permanent and non-changing slide identifier, rather than a slide number within the current version of the presentation, so that a user's designated cover slide does not change when slides are added, removed, or reordered within a presentation.

Additionally, in some embodiments, rather than designating a fixed cover slide, users may designate one or more cover slide criteria that may be evaluated on-the-fly to determine the user's selected cover slide. The user-selected criteria may include, for example, the slide most viewed by the user, the slide most viewed by all users, the slide most recently modified by the user, the slide most recently modified by any user, the slide most shared or downloaded by the user, the slide most shared or downloaded by all users, etc.). The criteria may be evaluated on-the-fly in response to the user's search request in step 301, to determine which slide within each presentation will be selected as the user's designated cover slide. Therefore, in such embodiment, a user's cover slide for a presentation may change based on ongoing document usage statistics, without any additional action taken by the user.

In step 305, the electronic presentation interface engine 120 may determine the presentation order of the search results to be displayed within the search result interface. As described above, various different sorting criteria may be provided with search requests received in step 301. Additionally, in the absence of any express sorting criteria provided with a search request, the storage repository 130 and/or electronic presentation interface engine 120 may implement one or more default sorting techniques (e.g., sorting by title, owner, author, creation date, modification date, most views, etc.).

In step 306, the electronic presentation interface engine 120 may generate and provide a search results interface to display the retrieved set of electronic presentation documents. As discussed above in reference to step 301, search results may be transmitted to and displayed on one or more client devices 110 via a client application, for example, a web browser, file manager application, or other client-based application. In some cases, search results may be rendered within the same user interface and/or the same screen as the search request user interface elements discussed above.

Figure 8A:
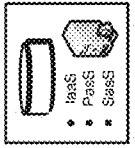
FIGS. 8A and 8B are example user interface screens configured to provide customized search results based on searches of electronic presentations within a storage repository, according to one or more embodiments of the present invention.
Figure 8B:
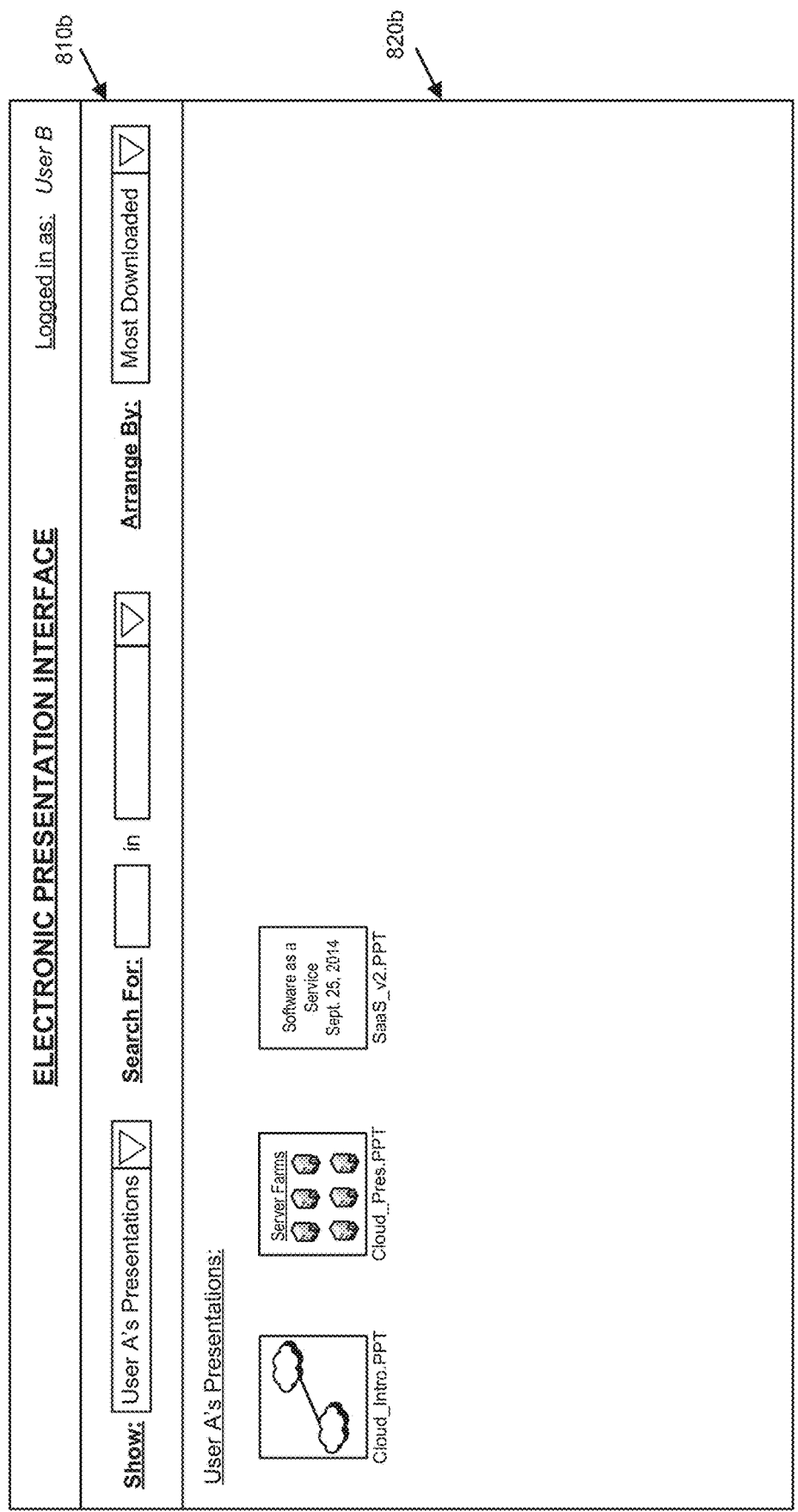

Referring now to FIGS. 8A and 8B, two example user interface screens are shown on which search results have been displayed in response to a search request. The user interface screens 800a and 800b in these examples may each display a set of electronic presentation documents retrieved from a storage repository 130 in response to a search request initiated by a user via a client device 110 to an electronic presentation interface engine 120. Thus, the user interface screens 800a and 800b may correspond to the culmination of steps 301-306, described above.

In this example, user interface screen 800a in FIG. 8A may correspond to a search results interface displayed in response to a search request by a first user (User A). In this case, User A has initiated a search via search request region 810a for all accessible presentations, which may retrieve and display the sum of all electronic presentation documents owned by User A, shared with User A, and publicly accessible (or otherwise accessible to User A). The search results region 820a has been populated with eight electronic presentation results, each result including a thumbnail and presentation title. As discussed above in reference to step 304 and in FIG. 7, one or more of the thumbnail images shown in screen 800a may be user-specific to User A, meaning that they may be based on a designated cover slide selected specifically by User A, or by another user associated with User A and/or the presentation document (e.g., a document sharer or owner).

User interface screen 800b in FIG. 8B may correspond to another search results interface displayed in response to a separate search request by a second user (User B). In this case, User B has initiated a search via search request region 810b only for User A's presentations. Accordingly, the search results region 820b has been populated with three electronic presentation results, matching three of the four electronic presentations shown under User A's presentations in FIG. 8A. Because the presentation "SaaS_v1.PPT" is not shown in search results region 820b of FIG. 8B, it may be assumed that User B does not have permissions to access this presentation owned by User A. In other cases, User B may provide different searching criteria (e.g., different document owners, text-based search criteria, etc.) which will cause a different set of presentations to be retrieved and displayed in the search results region 820b. As in FIG. 8A, the search results region 820b in FIG. 8B shows a thumbnail for each retrieved presentation. However, it can be seen that two of the thumbnail images rendered in FIG. 8B do not match the thumbnail images for the same presentations shown in FIG. 8A. This may indicate that User B has designated user-specific cover slides for both the "Cloud Pres.PPT" and "SaaS_v2.PPT" presentations in this example, or that different thumbnails have been retrieved and/or generated for these presentations based on the other user-specific criteria and techniques discussed herein.

Figure 9:
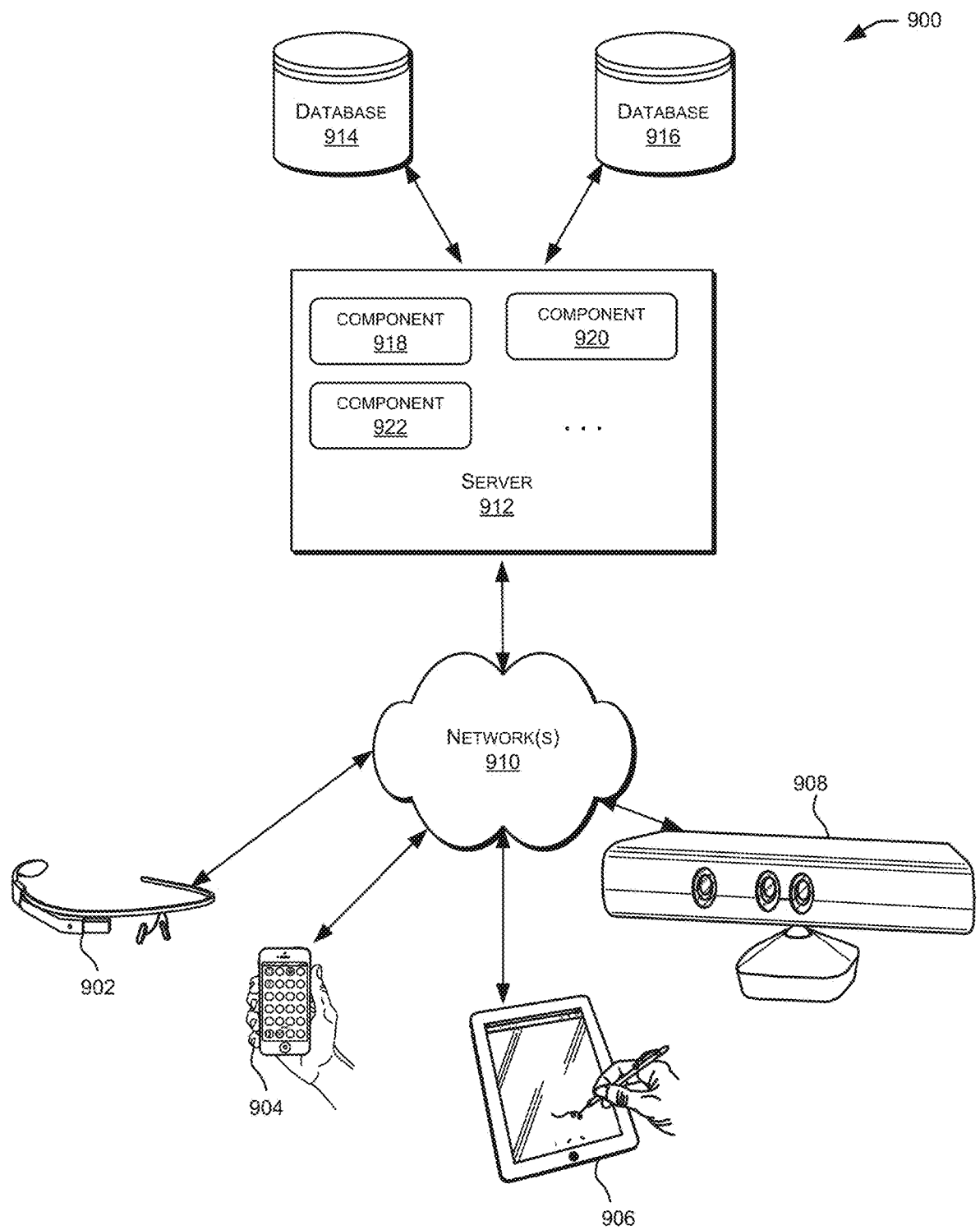
FIG. 9 is a block diagram illustrating components of an example distributed system in which various embodiments of the present invention may be implemented.

Referring now to FIG. 9, a block diagram illustrating components of an exemplary system in which various embodiments of the present invention may be implemented. In the illustrated embodiment, distributed system 900 includes one or more client computing devices 902, 904, 906, and 908, which are configured to execute and operate a client application such as a web browser, proprietary client (e.g., Oracle Forms), or the like over one or more network(s) 910. Server 912 may be communicatively coupled with remote client computing devices 902, 904, 906, and 908 via network 910.

In various embodiments, server 912 may be adapted to run one or more services or software applications provided by one or more of the components of the system. In some embodiments, these services may be offered as web-based or cloud services or under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in the figure, the software components 918, 920 and 922 of system 900 are shown as being implemented on server 912. In other embodiments, one or more of the components of system 900 and/or the services provided by these components may also be implemented by one or more of the client computing devices 902, 904, 906, and/or 908. Users operating the client computing devices may then utilize one or more client applications to use the services provided by these components. These components may be implemented in hardware, firmware, software, or combinations thereof. It should be appreciated that various different system configurations are possible, which may be different from distributed system 900. The embodiment shown in the figure is thus one example of a distributed system for implementing an embodiment system and is not intended to be limiting.

Client computing devices 902, 904, 906, and/or 908 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 902, 904, 906, and 908 may be any other electronic device, such as a thin-client computer, an Internet-enabled gaming system (e.g., a Microsoft Xbox gaming console with or without a Kinect® gesture input device), and/or a personal messaging device, capable of communicating over network(s) 910.

Although exemplary distributed system 900 is shown with four client computing devices, any number of client computing devices may be supported. Other devices, such as devices with sensors, etc., may interact with server 912.

Network(s) 910 in distributed system 900 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 910 can be a local area network (LAN), such as one based on Ethernet, Token-Ring and/or the like. Network(s) 910 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 912 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 912 may be adapted to run one or more services or software applications described in the foregoing disclosure. For example, server 912 may correspond to a server for performing processing described above according to an embodiment of the present disclosure.

Server 912 may run an operating system including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 912 may include one or more applications to analyze and consolidate data feeds and/or event updates received from users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more databases 914 and 916. Databases 914 and 916 may reside in a variety of locations. By way of example, one or more of databases 914 and 916 may reside on a non-transitory storage medium local to (and/or resident in) server 912. Alternatively, databases 914 and 916 may be remote from server 912 and in communication with server 912 via a network-based or dedicated connection. In one set of embodiments, databases 914 and 916 may reside in a storage-area network (SAN). Similarly, any necessary files for performing the functions attributed to server 912 may be stored locally on server 912 and/or remotely, as appropriate. In one set of embodiments, databases 914 and 916 may include relational databases, such as databases provided by Oracle, that are adapted to store, update, and retrieve data in response to SQL-formatted commands.

Figure 10:
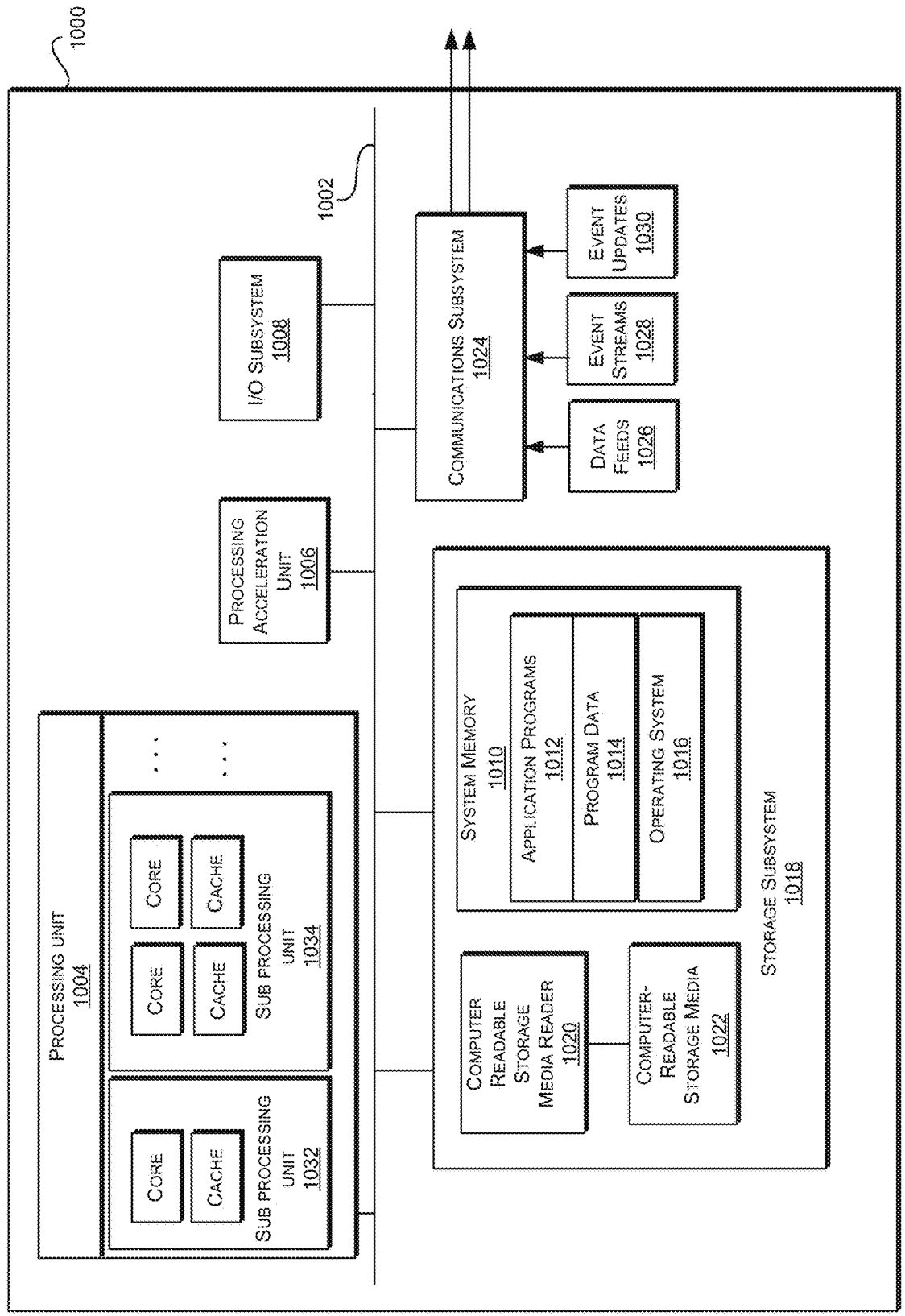
FIG. 10 is a block diagram illustrating an exemplary computer system in which embodiments of the present invention may be implemented.

Referring now to FIG. 10, a block diagram is shown illustrating an exemplary computer system in which embodiments of the present invention may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present invention.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include non-transitory and tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums or memory devices, such as CD-ROMs or other type of optical disks, floppy diskettes, ROMs, RAMs, EPROMs, EEPROMs, magnetic or optical cards, flash memory, or other types of machine-readable mediums or memory devices suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A non-transitory computer-readable medium comprising instructions that, when executed by one or more processors, cause the one or more processors to perform operations comprising:
    accessing an electronic presentation document;
    identifying a slide within the electronic presentation document, wherein the slide is identified based at least in part on a user selection of the slide;
    generating a digital thumbnail image from the slide within the electronic presentation document; and
    causing the digital thumbnail image to be displayed to represent the electronic presentation document in a computer interface.

2. The non-transitory computer-readable medium of claim 1, wherein identifying the slide within the electronic presentation document comprises:
    identifying the slide as being previously selected by a user requesting the electronic presentation document.

3. The non-transitory computer-readable medium of claim 2, wherein a second user also identified a second slide in the electronic presentation document, such that the second slide is used to generate a second digital thumbnail image for the second user without affecting the use of the digital thumbnail image for the user.

4. The non-transitory computer-readable medium of claim 1, wherein identifying the slide within the electronic presentation document comprises:
identifying the slide as being previously selected by a user sharing the electronic presentation document.

5. The non-transitory computer-readable medium of claim 1, wherein identifying the user selection of the slide within the electronic presentation document comprises:
identifying the slide as being previously selected by an owner of the electronic presentation document.

6. The non-transitory computer-readable medium of claim 1, wherein identifying the slide within the electronic presentation document comprises:
determining whether a user requesting the electronic presentation document previously selected the slide;
if the user requesting the electronic presentation document did not previously select the slide, determining whether a user sharing the electronic presentation document previously selected the slide; and
if the user sharing the electronic presentation document did not previously select the slide, determining whether an owner of the electronic presentation document previously selected the slide.

7. The non-transitory computer-readable medium of claim 1, wherein the electronic presentation document comprises a plurality of slides that may be displayed individually as a slide presentation in a electronic presentation application.

8. The non-transitory computer-readable medium of claim 1, wherein the operations further comprise:
receiving a search request to search electronic presentation documents using a search criterion.

9. The non-transitory computer-readable medium of claim 8, wherein the operations further comprise:
retrieving a plurality of electronic presentation documents that satisfy at least the search criterion, wherein the plurality of electronic presentation documents comprises the electronic presentation document.

10. The non-transitory computer-readable medium of claim 9, wherein the operations further comprise:
identifying user selections of slides within the plurality of electronic presentation documents.

11. The non-transitory computer-readable medium of claim 10, wherein the operations further comprise:
generating digital thumbnail images from the slides within the plurality of electronic presentation documents.

12. The non-transitory computer-readable medium of claim 11, wherein the operations further comprise:
causing the digital thumbnail images to be displayed to represent the plurality of electronic presentation documents in a search results interface.

13. The non-transitory computer-readable medium of claim 1, wherein the digital thumbnail image for the electronic presentation document is generated before receiving a search request.

14. The non-transitory computer-readable medium of claim 1, wherein the slide is also identified based at least in part on document usage statistics for the electronic presentation document.

15. The non-transitory computer-readable medium of claim 14, wherein the document usage statistics comprise a number of per-slide views within the electronic presentation document.

16. The non-transitory computer-readable medium of claim 14, wherein the document usage statistics comprise a number of per-slide shares within the electronic presentation document.

17. The non-transitory computer-readable medium of claim 14, wherein the document usage statistics comprise a number of per-slide downloads within the electronic presentation document.

18. The non-transitory computer-readable medium of claim 1, wherein the slide comprises an animation, and the digital thumbnail image is generated to include a low-resolution version of the animation.

19. A method comprising:
accessing an electronic presentation document;
identifying a slide within the electronic presentation document, wherein the slide is identified based at least in part on a user selection of the slide;
generating a digital thumbnail image from the slide within the electronic presentation document; and
causing the digital thumbnail image to be displayed to represent the electronic presentation document in a computer interface.

20. A system comprising:
one or more processors; and
one or more memories comprising instructions that, when executed by the one or more processors, cause the one or more processors to perform operations comprising:
accessing an electronic presentation document;
identifying a slide within the electronic presentation document, wherein the slide is identified based at least in part on a user selection of the slide;
generating a digital thumbnail image from the slide within the electronic presentation document; and
causing the digital thumbnail image to be displayed to represent the electronic presentation document in a computer interface.

* * * * *